(12) United States Patent
Fukushima et al.

(10) Patent No.: US 11,122,204 B2
(45) Date of Patent: Sep. 14, 2021

(54) IMAGE CAPTURING CONTROL APPARATUS, CONTROL METHOD, AND STORAGE MEDIUM

(71) Applicant: CANON KABUSHIKI KAISHA, Tokyo (JP)

(72) Inventors: Yuki Fukushima, Yokohama (JP); Yuta Masuda, Kawasaki (JP); Yuko Izaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/896,256

(22) Filed: Jun. 9, 2020

(65) Prior Publication Data

US 2020/0304714 A1  Sep. 24, 2020

Related U.S. Application Data

(63) Continuation of application No. 16/113,319, filed on Aug. 27, 2018, now Pat. No. 10,728,452.

(30) Foreign Application Priority Data

Sep. 4, 2017 (JP) .............................. JP2017-169607
Jun. 11, 2018 (JP) .............................. JP2018-111219
Jun. 11, 2018 (JP) .............................. JP2018-111220

(51) Int. Cl.
*H04N 5/232* (2006.01)
*H04N 5/235* (2006.01)

(52) U.S. Cl.
CPC ......... *H04N 5/23245* (2013.01); *H04N 5/232* (2013.01); *H04N 5/2353* (2013.01); *H04N 5/232933* (2018.08); *H04N 5/232939* (2018.08)

(58) Field of Classification Search
CPC ............... H04N 5/232; H04N 5/23212; H04N 5/23245; H04N 5/232939;
(Continued)

(56) References Cited

U.S. PATENT DOCUMENTS 7,889,246 B2  2/2011  Fujio et al.
8,542,306 B2  9/2013  Aoki et al.
(Continued)

FOREIGN PATENT DOCUMENTS

CN  102150422 A  8/2011
CN  104364747 A  2/2015
(Continued)

OTHER PUBLICATIONS

May 31, 2021 Korean Official Action in Korean Patent Appln. No. 10-2018-0103168.
(Continued)

*Primary Examiner* — Nhan T Tran
*Assistant Examiner* — Chriss S Yoder, III
(74) *Attorney, Agent, or Firm* — Venable LLP

(57) ABSTRACT

There is provided an image capturing control apparatus. An image capturing control unit controls image capturing by an image capturing unit based on setting values of a plurality of setting items. A selection unit selects a setting item from among the plurality of setting items. A changing unit changes the setting value of the setting item selected by the selection unit to a setting value that is selected in accordance with a first operation from among a plurality of setting values that correspond to the selected setting item and a specific setting value to which one of the plurality of setting values that is automatically determined in accordance with predetermined processing is applied.

14 Claims, 17 Drawing Sheets

(58) Field of Classification Search
CPC ..... H04N 5/232933; H04N 5/235–243; H04N 5/351; H04N 5/353–3537; G03B 7/00–14; G03B 7/30
See application file for complete search history.

(56) References Cited

U.S. PATENT DOCUMENTS

| | | |
|---|---|---|
| 3,253,407 A1 | 2/2016 | Heo et al. |
| 9,736,386 B2 | 8/2017 | Yamaguchi et al. |
| 10,088,987 B2 | 10/2018 | Izaki |
| 10,158,800 B2 | 12/2018 | Yoshikawa |
| 2004/0218065 A1 | 11/2004 | Schinner |
| 2008/0036895 A1 | 2/2008 | Kosaka |
| 2008/0285967 A1 | 11/2008 | Yamanaka |
| 2009/0040332 A1 | 2/2009 | Yoshino et al. |
| 2010/0033615 A1 | 2/2010 | Mori |
| 2011/0164164 A1 | 7/2011 | Aoki et al. |
| 2012/0127189 A1 | 5/2012 | Park et al. |
| 2015/0149945 A1 | 5/2015 | Izaki |
| 2016/0191800 A1 | 6/2016 | Yoshikawa |

FOREIGN PATENT DOCUMENTS

| | | |
|---|---|---|
| CN | 107111214 A | 8/2017 |
| JP | 2013-162190 A | 8/2013 |
| JP | 2014-056470 A | 3/2014 |
| KR | 10-2005-0062253 A | 6/2005 |

OTHER PUBLICATIONS

May 29, 2020 Chinese Official Action in Chinese Patent Appln. No. 201810993740.8.
Feb. 11, 2019 European Search Report in European Patent Appln. No. 18188414.9.

FIG. 10A

| \multicolumn{4}{c}{SHUTTER SPEED (STILL IMAGE) TABLE} |||| 
|---|---|---|---|
| No | VALUE | No | VALUE |
| 0(N_Min) | 30 SECOND | 31 | 1/40 SECOND |
| 1 | 25 SECOND | 32 | 1/50 SECOND |
| 2 | 20 SECOND | 33 | 1/60 SECOND |
| 3 | 15 SECOND | 34 | 1/80 SECOND |
| 4 | 13 SECOND | 35 | 1/100 SECOND |
| 5 | 10 SECOND | 36 | 1/125 SECOND |
| 6 | 8 SECOND | 37 | 1/160 SECOND |
| 7 | 6 SECOND | 38 | 1/200 SECOND |
| 8 | 5 SECOND | 39 | 1/250 SECOND |
| 9 | 4 SECOND | 40 | 1/320 SECOND |
| 10 | 3.2 SECOND | 41 | 1/400 SECOND |
| 11 | 2.5 SECOND | 42 | 1/500 SECOND |
| 12 | 2 SECOND | 43 | 1/640 SECOND |
| 13 | 1.6 SECOND | 44 | 1/800 SECOND |
| 14 | 1.3 SECOND | 45 | 1/1000 SECOND |
| 15 | 1 SECOND | 46 | 1/1250 SECOND |
| 16 | 0.8 SECOND | 47 | 1/1600 SECOND |
| 17 | 0.6 SECOND | 48 | 1/2000 SECOND |
| 18 | 0.5 SECOND | 49 | 1/2500 SECOND |
| 19 | 0.4 SECOND | 50 | 1/3200 SECOND |
| 20 | 0.3 SECOND | 51 | 1/4000 SECOND |
| 21 | 1/4 SECOND | 52 | 1/5000 SECOND |
| 22 | 1/5 SECOND | 53 | 1/6400 SECOND |
| 23 | 1/6 SECOND | 54(N_Max) | 1/8000 SECOND |
| 24 | 1/8 SECOND | 55 | Auto |
| 25 | 1/10 SECOND | — | — |
| 26 | 1/13 SECOND | — | — |
| 27 | 1/15 SECOND | — | — |
| 28 | 1/20 SECOND | — | — |
| 29 | 1/25 SECOND | — | — |
| 30 | 1/30 SECOND | — | — |

FIG. 10B

| APERTURE VALUE TABLE ||
|---|---|
| No | VALUE |
| 0(N_Min) | 1 |
| 1 | 1.1 |
| 2 | 1.2 |
| 3 | 1.4 |
| 4 | 1.5 |
| 5 | 1.8 |
| 6 | 2 |
| 7 | 2.2 |
| 8 | 2.5 |
| 9 | 2.8 |
| 10 | 3.2 |
| 11 | 3.5 |
| 12 | 4 |
| 13 | 4.5 |
| 14 | 5 |
| 15 | 5.6 |
| 16 | 6.3 |
| 17 | 7.1 |
| 18 | 8 |
| 19 | 9 |
| 20 | 10 |
| 21 | 11 |
| 22 | 13 |
| 23 | 14 |
| 24 | 16 |
| 25 | 18 |
| 26 | 20 |
| 27 | 22 |
| 28 | 25 |
| 29 | 29 |
| 30 | 32 |
| 31 | 36 |
| 32 | 40 |
| 33 | 45 |
| 34 | 51 |
| 35 | 57 |
| 36 | 64 |
| 37 | 72 |
| 38 | 81 |
| 39(N_Max) | 91 |
| 40 | Auto |

FIG. 10C

| ISO SPEED TABLE | |
|---|---|
| No | VALUE |
| 0(N_Min) | 100 |
| 1 | 125 |
| 2 | 160 |
| 3 | 200 |
| 4 | 250 |
| 5 | 320 |
| 6 | 400 |
| 7 | 500 |
| 8 | 640 |
| 9 | 800 |
| 10 | 1000 |
| 11 | 1250 |
| 12 | 1600 |
| 13 | 2000 |
| 14 | 2500 |
| 15 | 3200 |
| 16 | 4000 |
| 17 | 5000 |
| 18 | 6400 |
| 19 | 8000 |
| 20 | 10000 |
| 21(N_Max) | 12800 |
| 22 | Auto |

FIG. 10D

| EXPOSURE CORRECTION VALUE TABLE | |
|---|---|
| No | VALUE |
| 0(N_Min) | -3 |
| 1 | -2 2/3 |
| 2 | -2 1/3 |
| 3 | -2 |
| 4 | -1 2/3 |
| 5 | -1 1/3 |
| 6 | -1 |
| 7 | -2/3 |
| 8 | -1/3 |
| 9 | 0 |
| 10 | 1/3 |
| 11 | 2/3 |
| 12 | 1 |
| 13 | 1 1/3 |
| 14 | 1 2/3 |
| 15 | 2 |
| 16 | 2 1/3 |
| 17 | 2 2/3 |
| 18(N_Max) | 3 |

FIG. 10E

| SELECTED PARAMETER POSITION TABLE | |
|---|---|
| No | VALUE |
| 0(N_Min) | Tv VALUE |
| 1 | Av VALUE |
| 2 | EXPOSURE CORRECTION VALUE |
| 3(N_Max) | ISO |

F I G. 11A
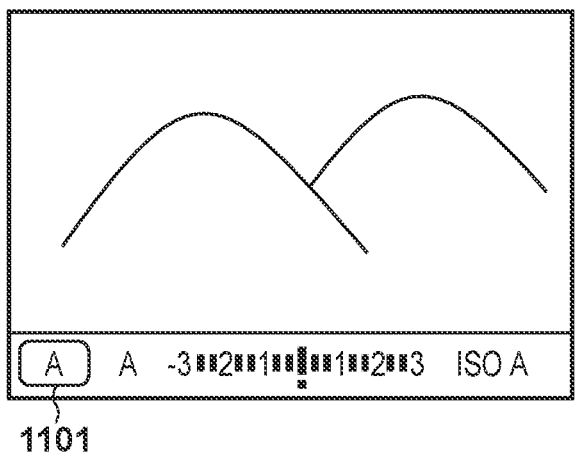
F I G. 11B
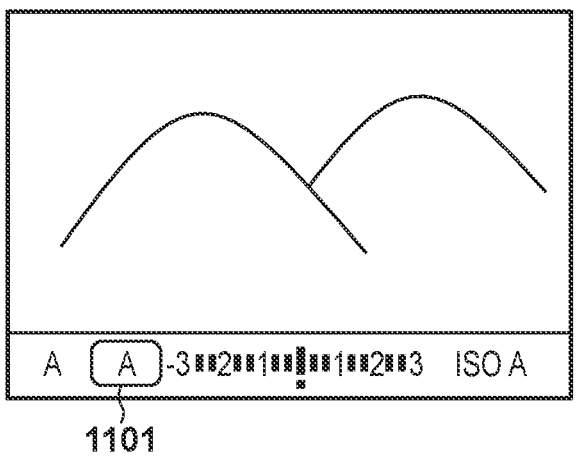
F I G. 11C
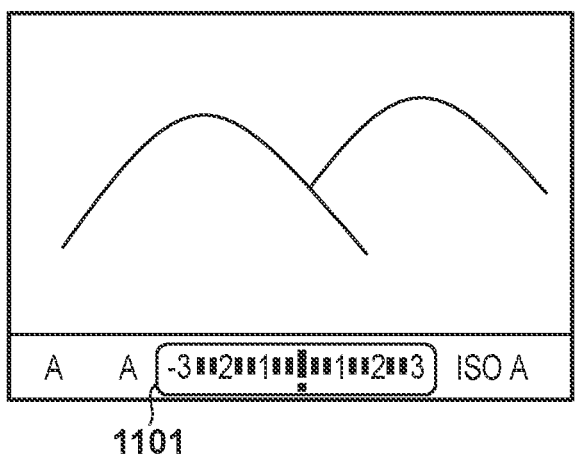
F I G. 11D
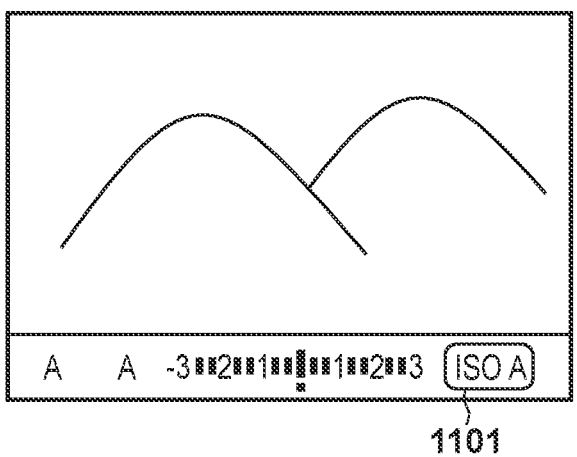

IMAGE CAPTURING CONTROL APPARATUS, CONTROL METHOD, AND STORAGE MEDIUM

This application is a continuation of application Ser. No. 16/113,319 filed Aug. 27, 2018.

BACKGROUND OF THE INVENTION

Field of the Invention

The present invention relates to an image capturing control apparatus, a control method, and a storage medium.

Description of the Related Art

Conventionally, exposure control has been performed such that, in a shutter-speed-priority mode (Tv mode), an aperture-priority mode (Av mode), and the like, setting values of some exposure-related items are set by a user and other items are automatically determined by the camera. On the other hand, in an automatic mode, the shutter speed, the aperture value, and the ISO speed are automatically determined by the camera based on photometry performed by the camera. Furthermore, in a manual mode, setting values of individual exposure-related items are set by the user.

Methods for setting values of a plurality of items have been proposed. Japanese Patent Laid-Open No. 2013-162190 discloses a method for setting values of a plurality of items such as a range of exposure, the correction amount of exposure, and priority of brightness or darkness. Furthermore, methods for setting values of items include a method in which setting values are automatically set by an apparatus, and a method in which setting values are set by a user. Japanese Patent Laid-Open No. 2014-056470 discloses a method for setting a setting value of the ISO speed, in which any one of ISO speed values displayed in a scale can be set, and also an automatic mode (Auto) to automatically determine a setting value of the ISO speed is set upon an auto-touch button being touched.

In the method disclosed in Japanese Patent Laid-Open No. 2013-162190, it is possible to set and change one of the plurality of items but is not possible to set and change all of the items that can be set to "Auto" at one time. In Japanese Patent Laid-Open No. 2014-056470, it is possible to set the ISO speed to "Auto" with one operation but is not possible to set, during the setting of the ISO speed, an item different from the ISO speed to "Auto".

SUMMARY OF THE INVENTION

The present invention was made in view of such circumstances, and provides an electronic apparatus that has improved operability when a plurality of setting items are set.

According to a first aspect of the present invention, there is provided an image capturing control apparatus comprising: an image capturing control unit configured to control image capturing by an image capturing unit based on setting values of a plurality of setting items; a selection unit configured to select a setting item from among the plurality of setting items; and a changing unit configured to change the setting value of the setting item selected by the selection unit to a setting value that is selected in accordance with a first operation from among a plurality of setting values that correspond to the selected setting item and a specific setting value to which one of the plurality of setting values that is automatically determined in accordance with predetermined processing is applied.

According to a second aspect of the present invention, there is provided a control method executed by an image capturing control apparatus, controlling image capturing by an image capturing unit based on setting values of a plurality of setting items; selecting a setting item from among the plurality of setting items; and changing the setting value of the selected setting item to a setting value that is selected in accordance with a first operation from among a plurality of setting values that correspond to the selected setting item and a specific setting value to which one of the plurality of setting values that is automatically determined in accordance with predetermined processing is applied.

According to a third aspect of the present invention, there is provided a non-transitory computer-readable storage medium which stores a program for causing a computer to execute a control method comprising: controlling image capturing by an image capturing unit based on setting values of a plurality of setting items; selecting a setting item from among the plurality of setting items; and changing the setting value of the selected setting item to a setting value that is selected in accordance with a first operation from among a plurality of setting values that correspond to the selected setting item and a specific setting value to which one of the plurality of setting values that is automatically determined in accordance with predetermined processing is applied.

Further features of the present invention will become apparent from the following description of exemplary embodiments with reference to the attached drawings.

BRIEF DESCRIPTION OF THE DRAWINGS

FIGS. 10A to 10D illustrate exposure parameter tables.

FIG. 10E illustrates a selected parameter position table.

FIGS. 11A to 11D illustrate the selected parameter position changing processing.

DESCRIPTION OF THE EMBODIMENTS

Hereinafter, embodiments of the present invention will be described with reference to the attached drawings. It should be noted that the technical scope of the present invention is defined by the claims, and is not limited by the following respective embodiments. Also, not all of the combinations of the aspects that are described in the embodiments are necessarily essential to the present invention. Also, the aspects that are described in the respective embodiments can be combined as appropriate.

First Embodiment

Figure 1A:
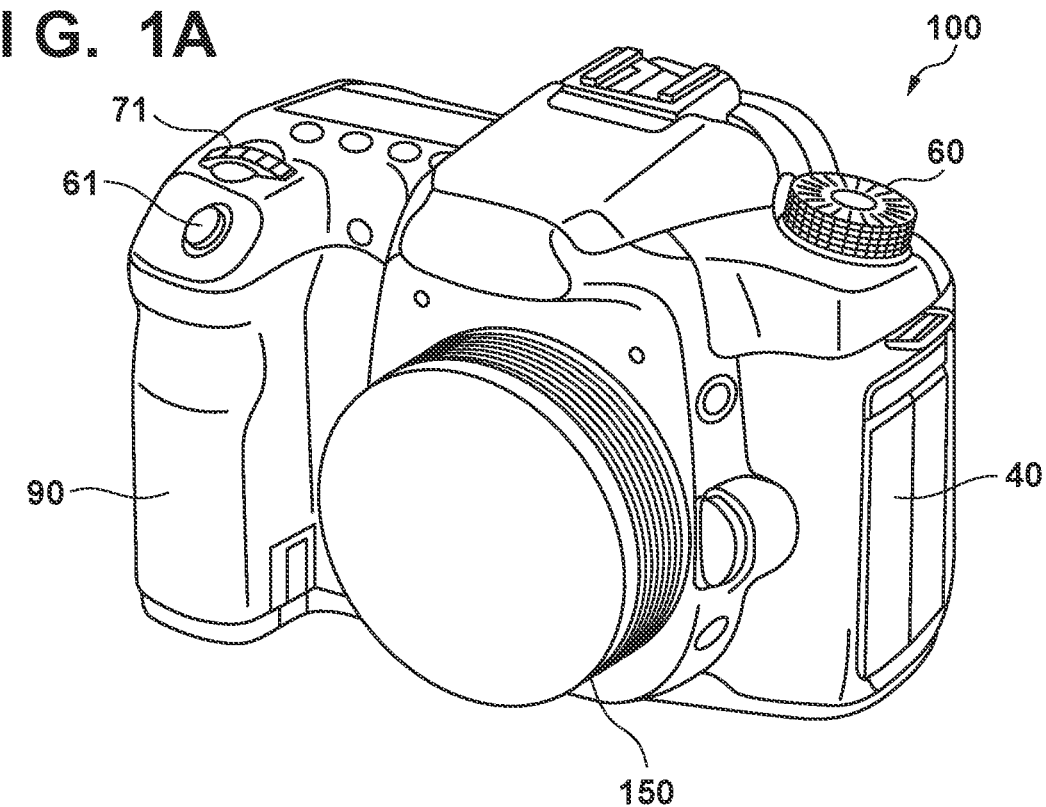
FIG. 1A is a front perspective view of a digital camera 100.
Figure 1B:
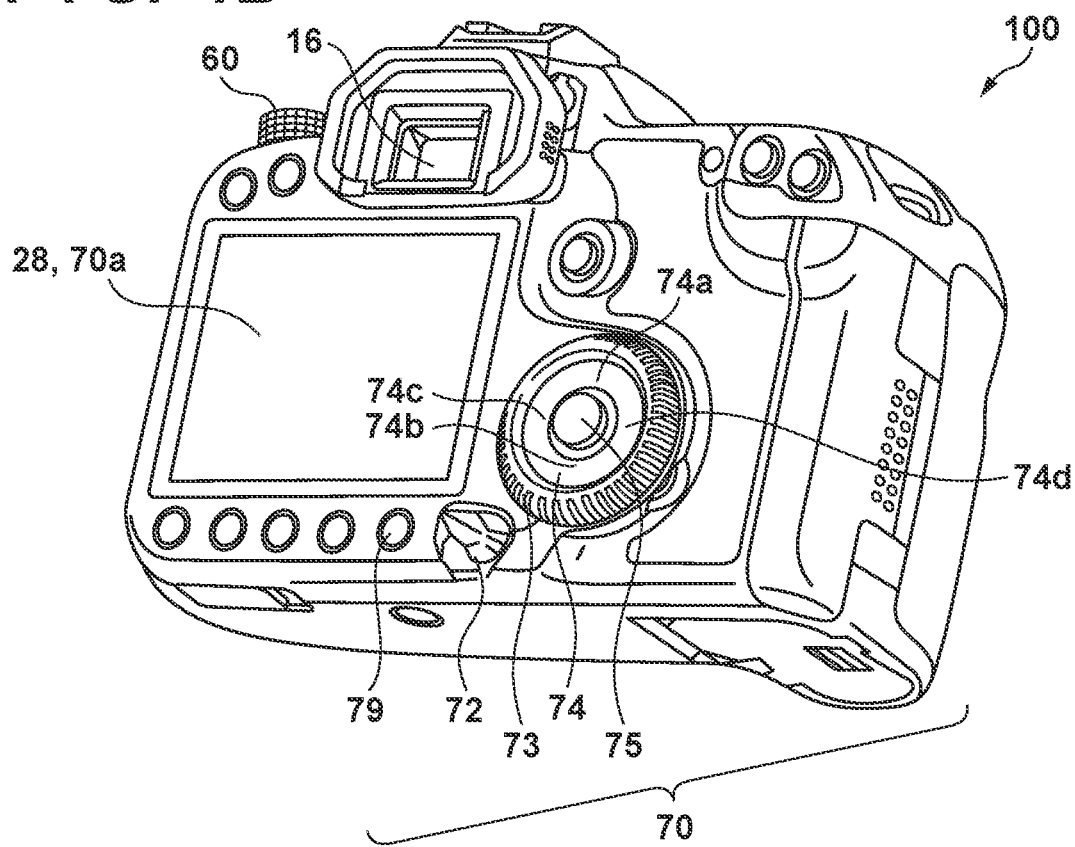
FIG. 1B is a rear perspective view of the digital camera 100.

FIG. 1A is a front perspective view showing a digital camera 100, which serves as an example of an electronic apparatus (image capturing control apparatus), and FIG. 1B is a rear perspective view showing the digital camera 100. In FIGS. 1A and 1B, a display unit 28 is a display unit for displaying an image or various types of information. A touch panel 70a is integrated with the display unit 28, and a user can touch the surface of the display unit 28 to intuitively select items or an object position displayed on the display unit 28. A shutter-release button 61 is an operation unit for giving a shooting instruction. A mode selection switch 60 is an operation unit for switching between various modes. A terminal cover 40 is a cover for protecting a connector (not-shown) for a connection cable that connects the digital camera 100 and an external apparatus to each other. A main electronic dial 71 is a rotating operation member, and by rotating the main electronic dial 71, setting values such as shutter speed or diaphragm aperture can be changed, for example. A power supply switch 72 is an operation member for turning on/off the digital camera 100. A sub electronic dial 73 is a rotating operation member for moving a selection frame, scrolling images, and the like. A cross key 74 is a four-directional key including an upper key 74a, a lower key 74b, a left key 74c, and a right key 74d, which can be pressed down, and can give an instruction to, for example, move a cursor or the like in the pressed direction. A SET button 75 is a push button for use mainly in determining selection items and the like. A reproduction button 79 is an operation button for switching between a shooting mode and a reproduction mode. When, during the shooting mode, the reproduction button 79 is pressed down, the digital camera 100 is switched to the reproduction mode, so that the latest image stored in a recording medium 200 (described later) can be displayed on the display unit 28. The shutter-release button 61, the main electronic dial 71, the power supply switch 72, the sub electronic dial 73, the cross key 74, the SET button 75, and the reproduction button 79 are included in operation unit 70. A viewfinder 16 is an eyepiece viewfinder through which a user observes a focusing screen 13 (described later) to check the focus and composition of an optical image of an object taken in through a lens unit 150. A grip 90 is a holding portion that has a shape that makes it easy to be gripped by a user's right hand when he or she holds the digital camera 100.

Figure 2:
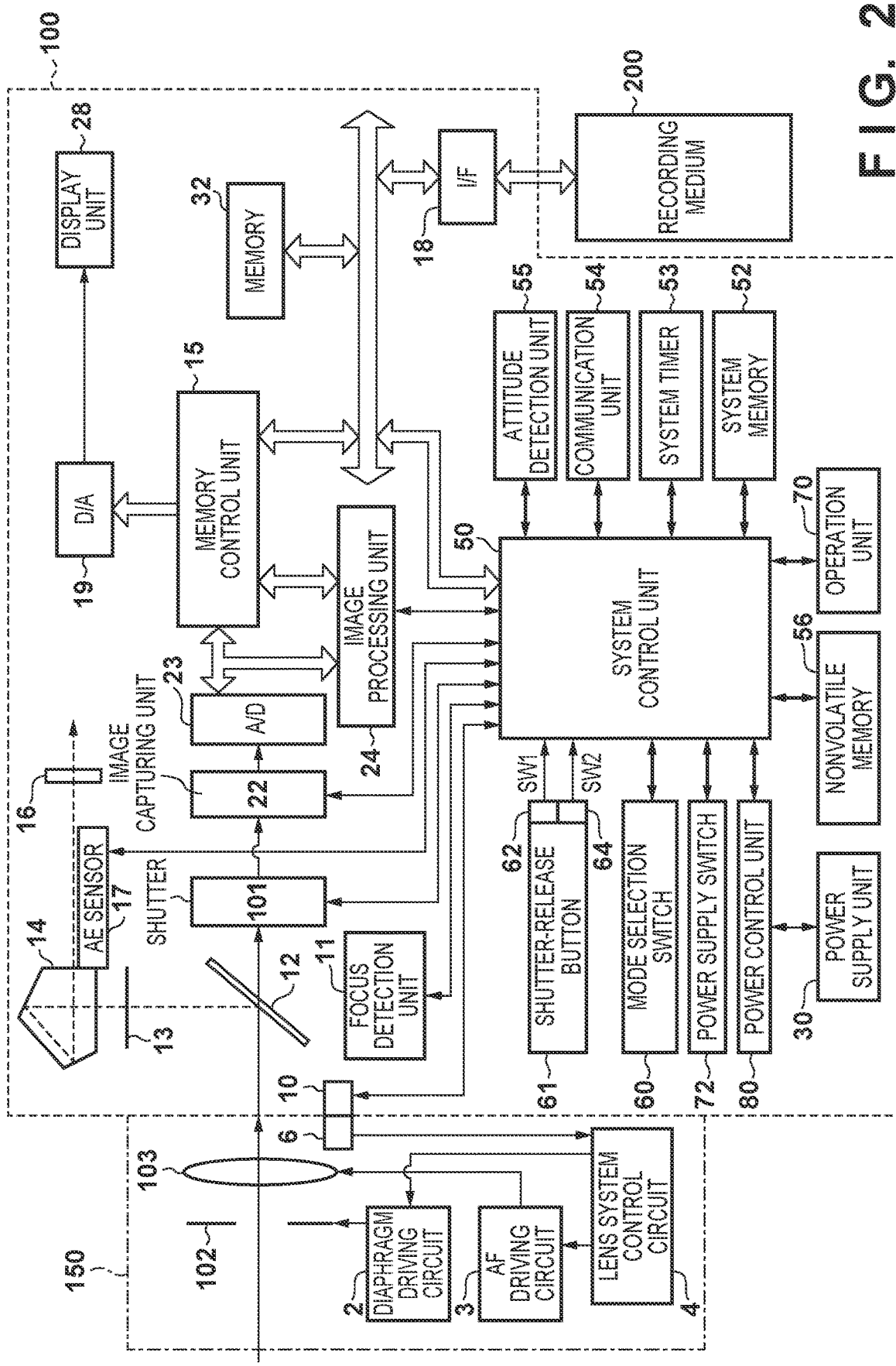
FIG. 2 is a block diagram illustrating an example of a configuration of the digital camera 100.

FIG. 2 is a block diagram showing an example of a configuration of the digital camera 100 according to the present embodiment. In FIG. 2, the lens unit 150 includes a shooting lens, and is replaceable.

A lens 103 is typically constituted by a plurality of lenses, but is simplified here and is shown only with one lens. A communication terminal 6 is a communication terminal through which the lens unit 150 communicates with the digital camera 100. A communication terminal 10 is a communication terminal through which the digital camera 100 communicates with the lens unit 150. The lens unit 150 communicates with a system control unit 50 through the communication terminals 6 and 10. Using a lens system control circuit 4, the lens unit 150 controls a diaphragm driving circuit 2 to drive a diaphragm 102, and controls an AF driving circuit 3 to displace the position of the lens 103, thereby bringing the object into focus.

An AE sensor 17 performs photometry to obtain the luminance of an object image formed on the focusing screen 13 through the lens unit 150 and a quick return mirror 12.

A focus detection unit 11 (AF sensor) is a phase difference detection type AF sensor that captures an image incident thereon via the quick return mirror 12 and a sub mirror (not-shown), and outputs information relating to a defocus amount to the system control unit 50. The system control unit 50 controls the lens unit 150 based on the information relating to a defocus amount to perform phase difference AF. Note that the AF method may be contrast AF instead of phase difference AF. Furthermore, the phase difference AF may also be performed, instead of using the focus detection unit 11, based on the defocus amount detected on an image capturing surface of an image capturing unit 22 (image capturing surface phase difference AF).

The quick return mirror 12 receives an instruction from the system control unit 50 at the time of exposure, live view shooting, or moving image shooting, and is raised and lowered by an actuator (not-shown). The quick return mirror 12 is a mirror for switching luminous flux entering the lens 103 between the viewfinder 16 side and the image capturing unit 22 side. The quick return mirror 12 is usually arranged so as to reflect and guide the luminous flux to the viewfinder 16, but when shooting is performed or live view is displayed, the quick return mirror 12 kicks upward and recedes from the luminous flux so as to guide the luminous flux to the image capturing unit 22 (mirror up). Furthermore, the central portion of the quick return mirror 12 is a half mirror such that some beams of light can pass through, and allows a portion of the luminous flux to pass through and enter the focus detection unit 11, which is a unit for performing focus detection.

By observing an image formed on the focusing screen 13 via a pentaprism 14 and the viewfinder 16, the user can check the focus and composition of an optical image of an object taken in through the lens unit 150.

A shutter 101 controls the exposure time of the image capturing unit 22 in accordance with the control of the system control unit 50. The image capturing unit 22 is an image sensor constituted by a CCD or CMOS sensor or the like that converts an optical image into electric signals. An A/D converter 23 converts an analog signal into a digital signal. The A/D converter 23 is used to convert an analog signal output from the image capturing unit 22 into a digital signal.

An image processing unit 24 performs resizing processing, such as predetermined pixel interpolation and reduction, and color conversion processing with respect to data from the A/D converter 23 or data from a memory control unit 15.

Furthermore, the image processing unit 24 performs predetermined calculation processing using captured image data, and the system control unit 50 performs exposure control and ranging control based on the obtained calculation results. Accordingly, AF (Automatic Focus) processing, AE (Automatic Exposure) processing, and EF (flash pre-emission) processing of the TTL (Through the Lens) type are performed. The image processing unit 24 also performs predetermined calculation processing using the captured image data, and AWB (Automatic White Balance) processing of the TTL type based on the obtained calculation results.

The data output from the A/D converter 23 is written into a memory 32 via both the image processing unit 24 and the memory control unit 15, or directly via the memory control unit 15. The memory 32 stores the image data that was obtained from the image capturing unit 22 and converted into digital data by the A/D converter 23, and image data to be displayed on the display unit 28. The memory 32 has a storage capacity that is sufficient for storing a predetermined number of still images as well as moving images and audio of a predetermined length of time.

The memory 32 also functions as a memory for image display (video memory). A D/A converter 19 converts the image data for display stored in the memory 32 into an analog signal and supplies the display unit 28 with the analog signal. In this way, the image data for display that was written into the memory 32 is displayed by the display unit 28 via the D/A converter 19. The display unit 28 performs display on the display unit such as an LCD in accordance with the analog signal from the D/A converter 19. As a result of the digital signals that have been subjected to A/D conversion once by the A/D converter 23 and were stored in the memory 32 being converted into analog signals by the D/A converter 19, and the analog signals being successively transmitted to the display unit 28 so as to be displayed thereon, an electronic viewfinder can be realized and through image display can be performed (live view display).

A nonvolatile memory 56 is, for example, an EEPROM, which is electrically erasable and recordable by the system control unit 50. In the nonvolatile memory 56, constants, programs, and the like for operating the system control unit 50 are stored. In this context, "programs" may refer to programs for executing various flowcharts that will be described later in the present embodiment.

The system control unit 50 includes at least one processor, and controls the entire digital camera 100. The system control unit 50 realizes, by executing the above-described programs stored in the nonvolatile memory 56, the procedures of the present embodiment that will be described later. A system memory 52 is a RAM. In the system memory 52, constants and variables for operating the system control unit 50, the programs read out from the nonvolatile memory 56, and the like are expanded. Furthermore, the system control unit 50 also controls the memory 32, the D/A converter 19, the display unit 28, and the like to perform display control. A system timer 53 is a timer unit for measuring time periods for various types of controls and the time of an integrated clock.

The mode selection switch 60, the shutter-release button 61, and the operation unit 70 are operation members for inputting various types of instructions into the system control unit 50. The mode selection switch 60 switches the operation mode of the system control unit 50 to any of a still image recording mode, a moving image recording mode, a reproduction mode, and the like. The still image recording mode includes an automatic shooting mode, an automatic scene determination mode, a manual mode, an aperture-priority mode (Av mode), and a shutter-speed-priority mode (Tv mode). Various scene modes in each of which scene-specific shooting setting is made, a program AE mode, a custom mode, and the like are included. Using the mode selection switch 60, the mode is directly switched to any of these modes included in the menu screen. Alternatively, it is also possible to switch, using the mode selection switch 60, to the menu screen and then to switch, using another operation member, to any of these modes included in the menu screen. Similarly, the moving image recording mode as well may include a plurality of modes.

While the shutter-release button 61 provided on the digital camera 100 is being operated, that is, pressed half-way (the shooting preparation instruction), the first shutter switch 62 is turned on and generates a first shutter switch signal SW1. Upon receiving the first shutter switch signal SW1, the system control unit 50 starts operations of the AF (Automatic Focus) processing, the AE (Automatic Exposure) processing, the AWB (Automatic White Balance) processing, the EF (flash pre-emission) processing, and the like.

When the operation of the shutter-release button 61 is complete, that is, the shutter-release button 61 is pressed fully (the shooting instruction), the second shutter switch 64 is turned ON and generates a second shutter switch signal SW2. Upon receiving the second shutter switch signal SW2, the system control unit 50 starts operations of a series of shooting processing from reading out signals from the image capturing unit 22 to writing image data to the recording medium 200.

For example, by selecting and operating various function icons displayed on the display unit 28, appropriate functions for each situation are assigned to the operation members of the operation unit 70, and the operation members thus act as various function buttons. Examples of these function buttons include an end button, a return button, an image scrolling button, a jump button, a narrow-down button, and an attribute change button. For example, a menu screen that allows various settings to be made is displayed on the display unit 28 by pressing the menu button. The user can make various settings intuitively by using the menu screen displayed on the display unit 28, the four directional key (cross key 74) including the upper, lower, left and right keys, the SET button 75, and the like.

The operation unit 70 include the various operation members serving as input units, which accept a user operation. The operation unit 70 include at least the following operation members: the shutter-release button 61, the main electronic dial 71, the power supply switch 72, the sub electronic dial 73, the cross key 74, the SET button 75, and the reproduction button 79.

A power control unit 80 is constituted by, for example, a battery detection circuit, a DC-DC converter, a switch circuit for switching over the block to be supplied with power, and detects whether a battery has been inserted or not, the type of the battery, and the residual capacity thereof. Further, the power control unit 80 controls the DC-DC converter in accordance with the detection results and an instruction from the system control unit 50, and supplies the necessary voltage for the necessary length of time to each of the units including the recording medium 200.

A power supply unit 30 comprises a primary battery such as an alkaline battery or a lithium battery, a secondary battery such as a NiCd battery, a NiMH battery, or a Li battery, an AC adaptor, or the like. A recording medium I/F 18 is an interface with the recording medium 200 such as a memory card or a hard disk. The recording medium 200 is a recording medium such as a memory card for recording shot images, and is constituted by a semiconductor memory, a magnetic disk, or the like. The power supply switch 72 is a switch for switching the digital camera 100 on and off.

A communication unit 54 is connected to an external apparatus wirelessly or via a wired cable, and transmits and receives a video signal or an audio signal. The communication unit 54 is also connectable to a wireless LAN (Local Area Network) or the Internet. The communication unit 54 can transmit an image (including a through image) captured by the image capturing unit 22 and an image stored in the recording medium 200, or can receive image data or various other information from the external apparatus.

An attitude detection unit 55 detects the attitude of the digital camera 100 with respect to the gravity direction. Based on the attitude detected by the attitude detection unit 55, it is possible to discern whether an image captured by the image capturing unit 22 has been shot with the digital camera 100 held in the landscape or portrait orientation. The system control unit 50 can add information about the orientation information corresponding to the attitude detected by the attitude detection unit 55 to the image file of the image captured by the image capturing unit 22, and can rotate and record the captured image. An acceleration sensor, a gyro sensor, and the like may be used as an attitude detection unit 55.

The digital camera 100 includes, among the operation unit 70, the touch panel 70a (see FIG. 1B) that is capable of detecting a touch operation made on the display unit 28. The touch panel 70a and the display unit 28 can be constructed as a single integrated unit. For example, the touch panel 70a is constructed in such a manner that the transmittance of light will not interfere with the display presented by the display unit 28, and is attached to the uppermost layer of the display face of the display unit 28. In addition, input coordinates on the touch panel 70a and display coordinates on the display unit 28 are correlated. As a result, a GUI (Graphical User Interface) can be constructed that makes it possible for the user to directly manipulate the screen displayed on the display unit 28. The system control unit 50 is capable of detecting the following touch operations and conditions obtained by contacting the touch panel 70a.

Newly touching of the touch panel 70a by a finger or pen which has not been in contact with the touch panel 70a. That is, a start of a touch (referred to as "touch-down" below).

A state in which the touch panel 70a is in contact with a finger or pen (referred to as "touch-on" below).

Movement of a finger or pen while in contact with the touch panel 70a (referred to as "touch-move" below).

Lifting of a finger or pen that has been in contact with the touch panel 70a. That is, an end of the touch (referred to as "touch-up" below).

A state in which the touch panel 70a is not being touched at all (referred to as "touch-off" below).

When touch-down is detected, the touch-on state is also detected at the same time. Unless touch-up is detected after touch-down, touch-on usually continues to be detected. Touch-move is also detected in a state where touch-on is being detected. Even if touch-on is being detected, touch-move is not detected unless the touch position moves. After touch-up of all the fingers or a pen that have been in contact with the screen is detected, the touch-OFF state is entered.

These operations/conditions and position coordinates at which the touch panel 70a is being touched by the finger or pen are communicated to the system control unit 50 through an internal bus. The system control unit 50 determines, based upon the information thus communicated, what kind of operation was performed on the touch panel 70a. As for "touch-move", the determination can be also made for every vertical component and horizontal component on the touch panel 70a with regard to the direction of movement of the finger or pen, which is moved on the touch panel 70a, based upon a change in the position coordinates. Further, if a touch-down on the touch panel 70a, a predetermined touch-move, and then a touch-up is detected, it is determined that a stroke has been drawn. An operation of quickly drawing a stroke is referred to as a "flick". An operation in which a finger is touched against the touch panel, swiftly moved a certain distance, and then lifted away will be referred to as a "flick", in other words, a flick is an operation in which a finger is swiftly flicked across the touch panel 70a. If a touch-move with a predetermined distance or longer and a predetermined speed or higher is detected, and then a touch-up is detected, it can be determined that a flick has been performed. Further, if a touch-move with a predetermined distance or longer and a speed less than the predetermined speed is detected, it can be determined that a drag has been performed. The touch panel 70a may employ a method that relies upon any of the following: resistive film, electrostatic capacitance, surface acoustic waves, infrared radiation, electromagnetic induction, image recognition and optical sensing. There are methods in which a touch is detected based on contact with the touch panel, as well as methods in which a touch is detected based on approach of a finger or a pen to the touch panel, and any method may be employed.

Figure 3:
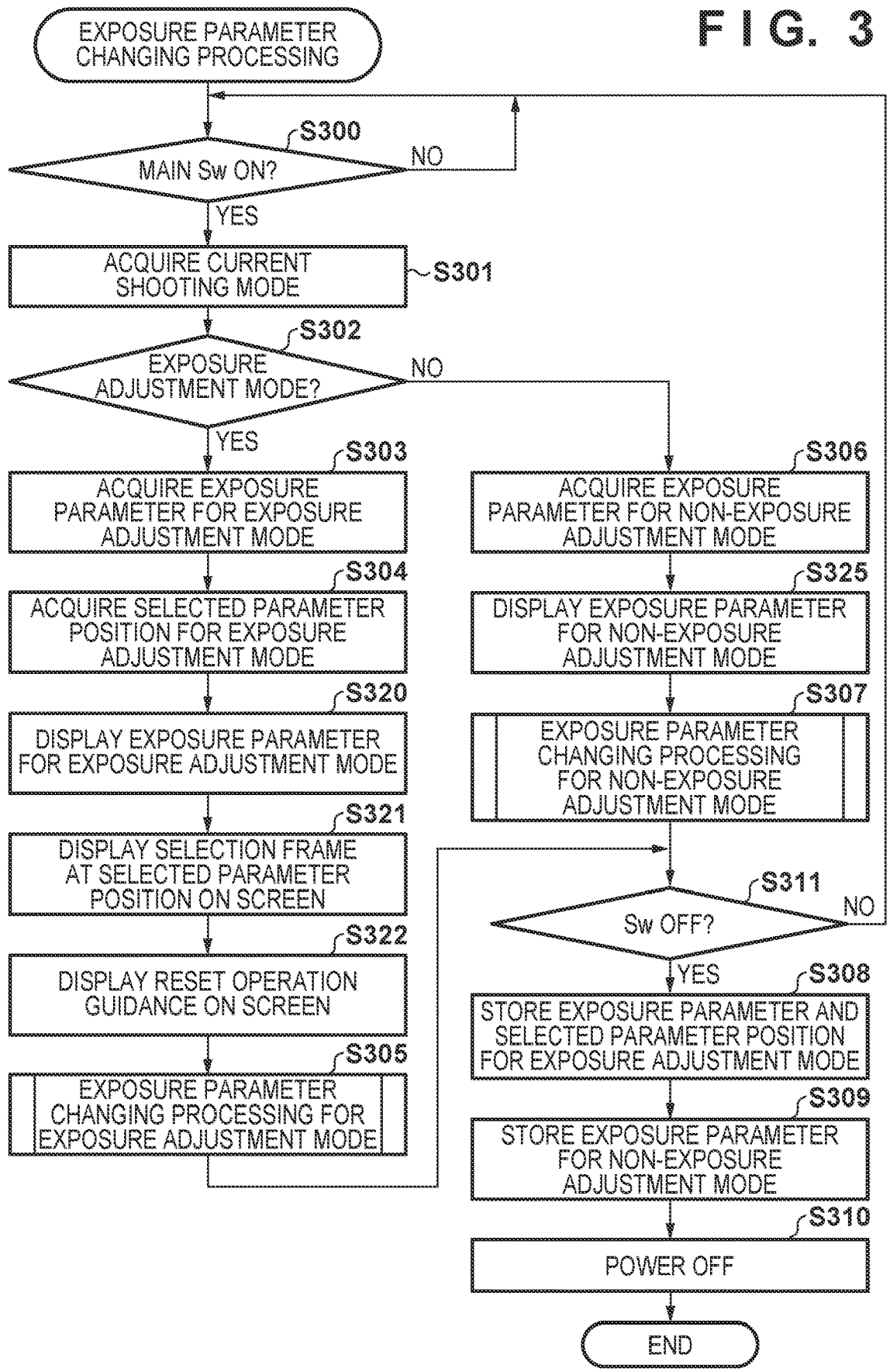
FIG. 3 is a flowchart illustrating a basic flow of exposure parameter changing processing that corresponds to a shooting mode, the exposure parameter changing processing being executed by the digital camera 100.

The following will describe a basic flow of exposure parameter changing processing based on the shooting mode that is executed by the digital camera 100 with reference to FIG. 3. The processes of steps of this flowchart are executed, unless otherwise noted, by the system control unit 50 expanding the program stored in the nonvolatile memory 56 onto the system memory 52 and executing the expanded program. The same is applied to the later-described flowcharts of FIGS. 4 to 9. The procedure of the present flowchart is started when, for example, the digital camera 100 is turned on.

In step S300, the system control unit 50 determines whether or not the power supply switch 72 is ON. If the power supply switch 72 is ON, the procedure moves to step S301, whereas if the power supply switch 72 is OFF, the procedure of step S300 is repeated.

In step S301, the system control unit 50 acquires the current shooting mode (exposure setting mode) of the digital camera 100. The shooting mode is recorded in the system memory 52, and the system control unit 50 reads out the shooting mode from the system memory 52.

In step S302, the system control unit 50 determines whether or not the shooting mode acquired in step S301 is an exposure adjustment mode. The procedure moves to step S303 if the shooting mode is the exposure adjustment mode, and moves to step S306 if the shooting mode is not the exposure adjustment mode.

In step S303, the system control unit 50 acquires, from the nonvolatile memory 56, exposure parameters relating to exposure control for the exposure adjustment mode. In the following description, it is assumed that the exposure parameters include the shutter speed, the aperture value, the ISO speed, and the exposure correction value, but the exposure parameters of the present embodiment are not limited to them.

In step S304, the system control unit 50 acquires, from the nonvolatile memory 56, a selected parameter position for the exposure adjustment mode.

Figure 15:
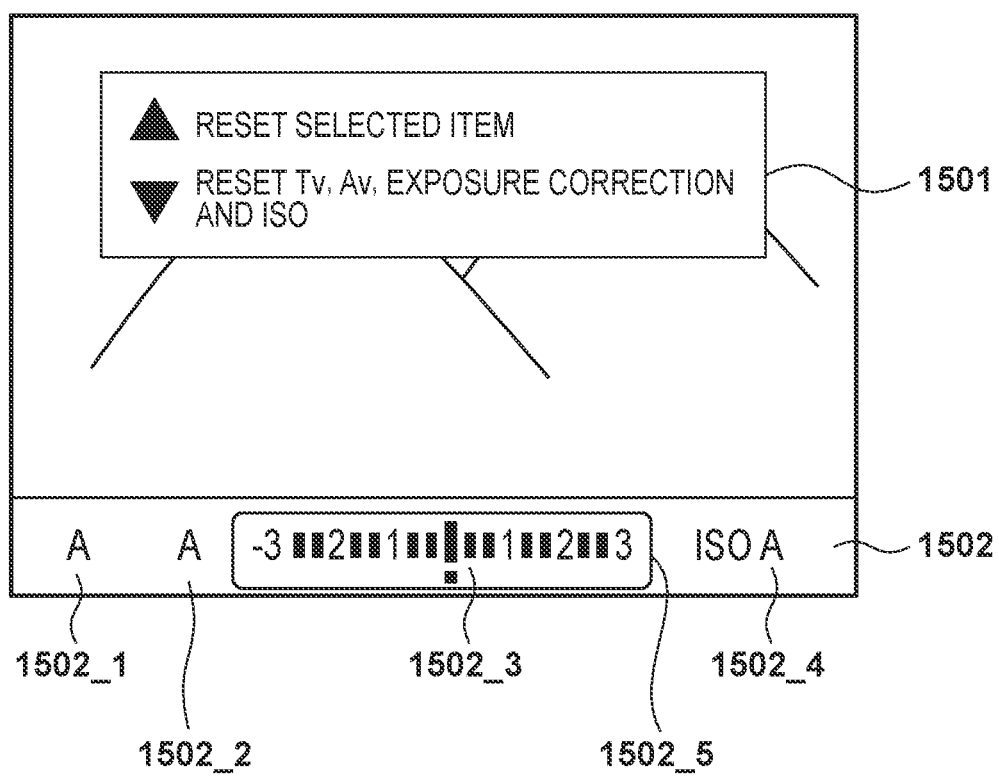
FIG. 15 is a diagram illustrating a setting display screen in the exposure adjustment mode.

In step S320, the system control unit 50 displays, on the display unit 28, a setting display screen 1502 on which exposure parameters for exposure adjustment are shown, together with live view, as shown in FIG. 15. In the present embodiment, the exposure parameters include the shutter speed, the aperture value, the exposure correction value, and the ISO speed. Accordingly, the system control unit 50 displays, on the setting display screen 1502, a shutter speed setting value 1502_1, an aperture value 1502_2, an exposure correction value 1502_3, and an ISO speed 1502_4.

In step S321, the system control unit 50 performs, on the setting display screen 1502, cursor display 1502_5 to show the selected parameter position, that is, the currently selected parameter, acquired in step S304 so that a user can identify it. As a method for displaying the selected parameter position, highlighting or color display may be performed, instead of the cursor display. Furthermore, in the present embodiment, an exposure correction position is used as an initial position for the selected parameter position. Since an exposure correction position is used as the initial position for the selected parameter position, a user can perform a shooting operation that is similar to that of the program mode.

Here, it is also possible that, if the exposure adjustment mode is entered or exited, the previous shooting operation in the exposure adjustment mode can be kept by storing the exposure parameters and selected parameter position for the exposure adjustment mode.

In step S322, the system control unit 50 displays, on the display unit 28, guidance 1501 relating to a reset operation method.

The guidance 1501 relates to the reset operation method, and explains an operation for resetting the selected item and an operation for resetting the Tv, the Av, the exposure correction, and the ISO.

Furthermore, for example, display of the guidance may be started at a timing at which the mode has been shifted to the exposure adjustment mode, and may disappear at a timing at which a predetermined time period has elapsed. Furthermore, the display of the guidance may remain, and is minimized, instead of disappearing, when a predetermined time period has elapsed. Furthermore, it is also possible that the guidance is displayed only when the mode has shifted to the exposure adjustment mode for the first time after the digital camera 100 was turned on.

Furthermore, if the function assigned to the operation member relevant to the reset operation displayed in the guidance is changed and the operation member no longer has the reset function, the guidance does not necessarily have to be displayed or the display content of the guidance may be changed.

Note that display of the guidance of the present embodiment is not limited to the above.

Although the procedure from steps S320 to S322 has been described separately, the system control unit 50 starts displaying the setting display screen 1502, the cursor display 1502_5, and the guidance 1501 at the same time, as shown in FIG. 15.

In step S305, the system control unit 50 performs exposure parameter changing processing for the exposure adjustment mode. The exposure parameter changing processing in the exposure adjustment mode will be described in detail later with reference to FIGS. 4A and 4B.

In step S306, the system control unit 50 acquires, from the nonvolatile memory 56, exposure parameters for a non-exposure adjustment mode. Then, in step S325, the system control unit 50 displays, on the display unit 28, the exposure parameters acquired in step S306, together with live view.

In step S307, the system control unit 50 performs exposure parameter changing processing in the modes different from the exposure adjustment mode. The mode different from the exposure adjustment mode is any of the shutter-speed-priority mode, the aperture value priority mode, the program AE mode, the manual mode (mode in which a user selects a setting value from setting value options), the automatic mode, and the like. The exposure parameter changing processing in a mode different from the exposure adjustment mode will be described in detail with reference to FIG. 7.

In step S311, the system control unit 50 determines whether or not the power supply switch 72 is OFF. If the power supply switch 72 is OFF, the procedure moves to step S308, otherwise the procedure returns to step S300.

In step S308, the system control unit 50 stores the exposure parameters and the selected parameter position for the exposure adjustment mode in the nonvolatile memory 56.

In step S309, the system control unit 50 stores, in the nonvolatile memory 56, the exposure parameters set in the modes different from the exposure adjustment mode.

In step S310, the system control unit 50 turns the digital camera 100 off.

Figure 4A:
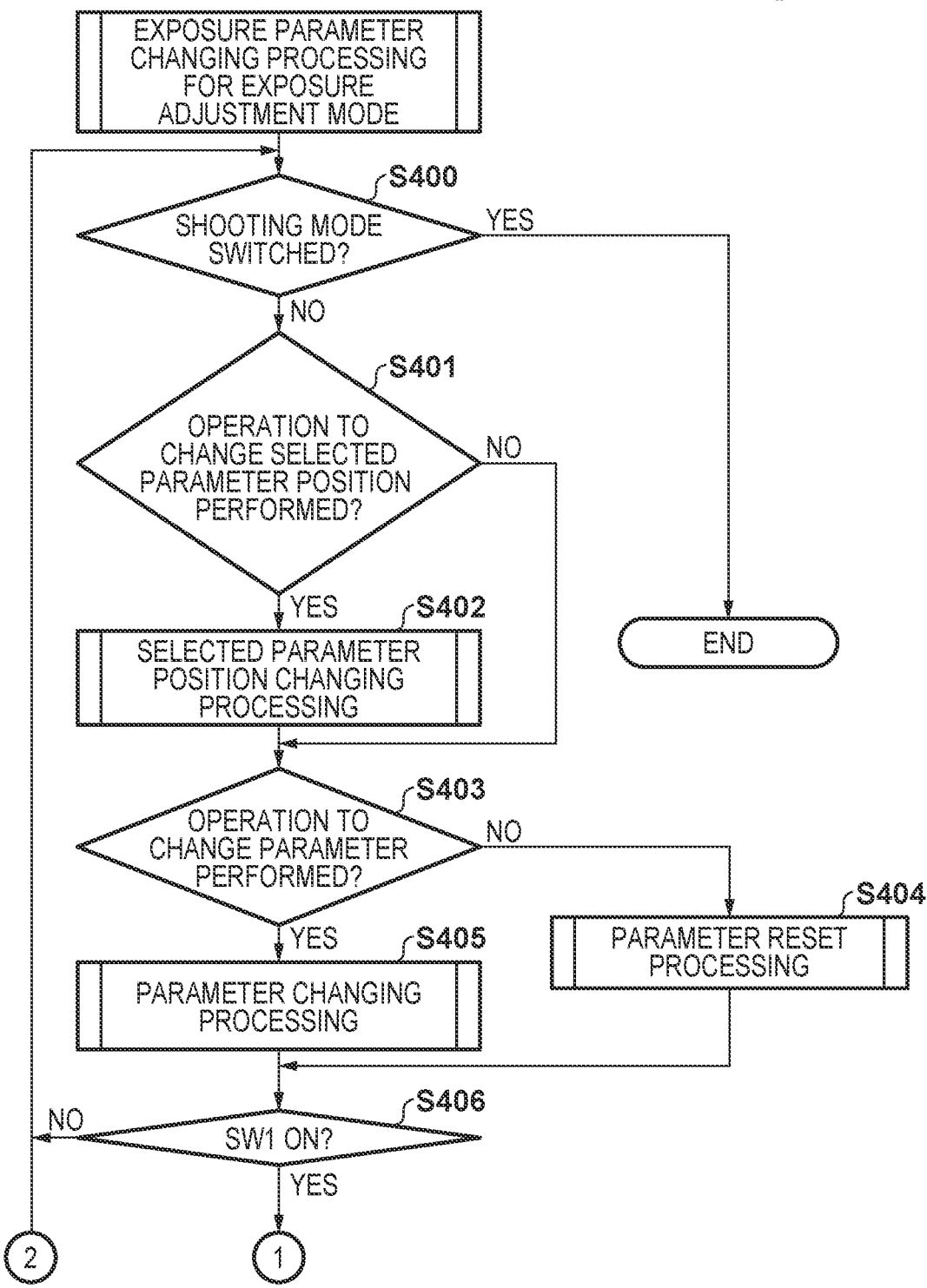
FIGS. 4A to 4B are flowcharts of exposure parameter changing processing for an exposure adjustment mode (step S305 in FIG. 3).
Figure 4B:
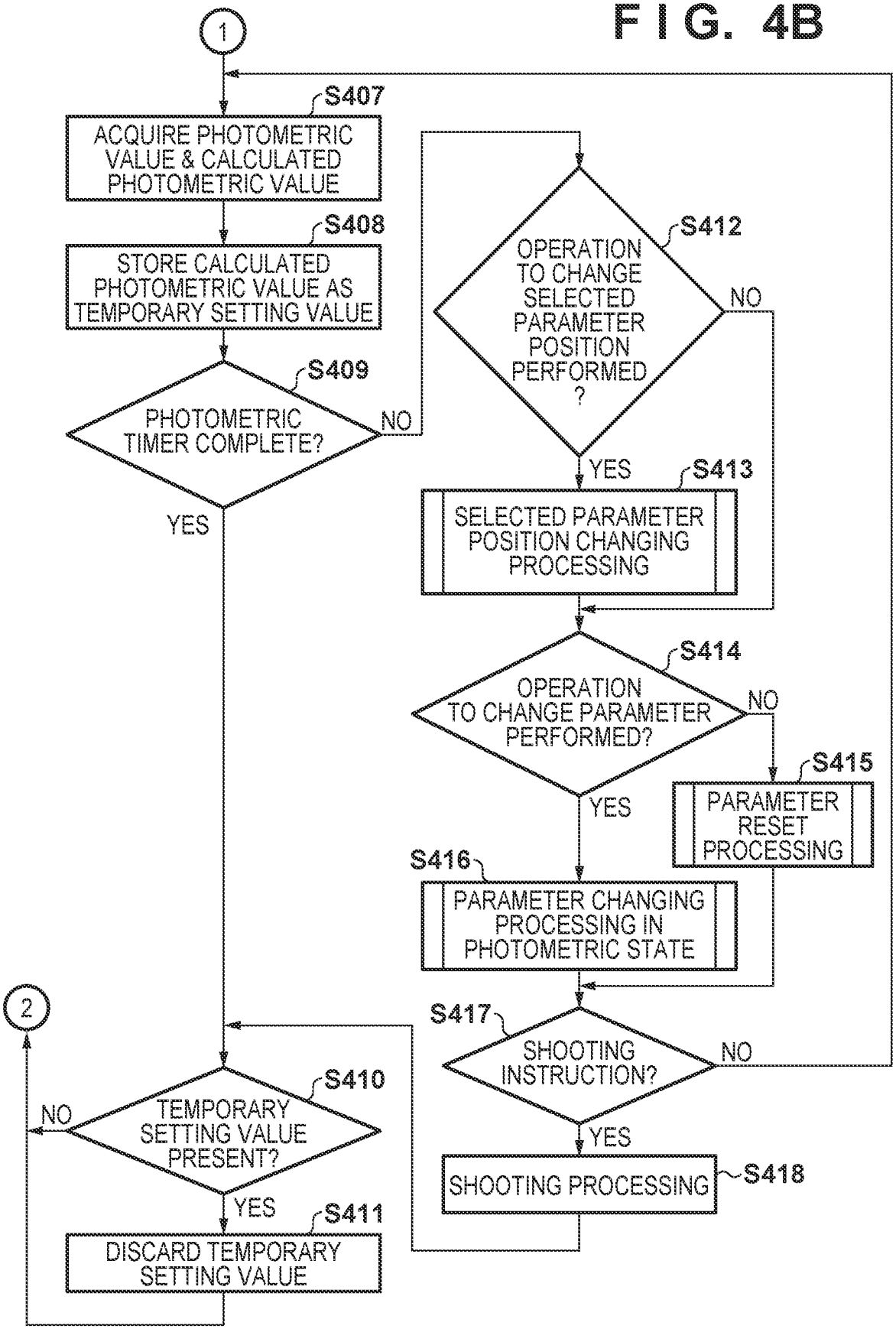

The following will describe the exposure parameter changing processing for the exposure adjustment mode (step S305 in FIG. 3) in detail with reference to FIGS. 4A and 4B.

In step S400, the system control unit 50 determines whether or not the shooting mode has been switched. If the shooting mode has been switched, the procedure of the present flowchart ends. If the shooting mode has not been switched, the procedure moves to step S401.

In step S401, the system control unit 50 determines whether or not an operation to change the selected parameter position has been performed. The operation to change the selected parameter position is performed, for example, by operating the sub electronic dial 73. The procedure moves to step S402 if the operation has been performed, and moves to step S403 if the operation has not been performed.

In step S402, the system control unit 50 performs selected parameter position changing processing. The selected parameter position changing processing will be described in detail later with reference to FIG. 5.

In step S403, the system control unit 50 determines whether or not an operation to change a parameter has been performed. The operation to change a parameter is performed, for example, by operating the main electronic dial 71. The procedure moves to step S405 if the operation to change a parameter has been performed, and moves to step S404 if the operation to change a parameter has not been performed.

In step S404, the system control unit 50 performs parameter reset processing. The parameter reset processing will be described in detail later with reference to FIG. 6.

In step S405, the system control unit 50 performs parameter changing processing. The parameter changing processing will be described in detail later with reference to FIG. 8.

In step S406, the system control unit 50 determines whether or not the first shutter switch 62 is ON. If the first shutter switch 62 is ON, the procedure moves to step S407, otherwise the procedure moves to step S400. Furthermore, a photometric timer is started in accordance with the shutter switch 62 (SW1) being turned on. After the shutter switch 62 has been turned ON, the processes in steps S407 and S408 are executed until the photometric timer has ended or until the result of step S417 is YES as a result of a shooting instruction being given.

In step S407, the system control unit 50 performs photometry (photometric processing) on an object, and acquires a photometric value (object brightness) and a calculated photometric value, which is calculated from the object brightness and the currently set value. The calculated photometric value is a setting value determined based on the result of the photometric processing, and is determined from among a plurality of setting values selectable as the respective exposure parameters.

In step S408, the system control unit 50 stores, in the system memory 52, the calculated photometric value as a temporary setting value of the exposure parameter. Note that for the exposure parameter, "Auto", which is a specific setting value for applying the setting value automatically determined during an operation in a predetermined operation mode, or a setting value indicating a specific numerical value such as "1/60 second" designated by a user was set. A temporary setting value is stored for the exposure parameter whose setting value is "Auto". In other words, the setting value of the item for which the setting value is set by a user prior to step S406, that is, before the photometry is performed, is not changed, but the setting value of the item for which "Auto" is set is calculated based on a photometric result and is recorded as a temporary setting value. Also, the system control unit 50 switches, on the setting display screen that displays the exposure parameter for which "Auto" is set, "A", which indicates that the setting value is "Auto", to the temporary setting value and displays the temporary setting value. The display will be described in detail later with reference to FIGS. 13A to 13E.

In step S409, the system control unit 50 determines whether or not the photometric timer has ended. If the photometric timer has ended, the procedure moves to step S410, otherwise the procedure moves to step S412.

In step S410, the system control unit 50 determines whether or not the temporary setting value was stored in the system memory 52. If the temporary setting value was stored, the procedure moves to step S411, otherwise the procedure moves to step S400.

In step S411, the system control unit 50 deletes, from the system memory 52, the temporary setting value that was calculated based on the photometric result obtained in step S407 and stored in step S408. The temporary setting value is deleted from the system memory 52 when the photometric timer has ended, that is, when a predetermined time period has elapsed since the SW1 was turned ON and the photometric processing was started.

As described above, during the predetermined time from when the SW1 has been turned on until the photometric timer has ended, the digital camera 100 is in a photometric state in which the photometric processing in step S407 and the processing for storing the temporary setting value in step S408 are performed continuously. Then, the photometric processing is complete when the photometric timer has ended, and the digital camera 100 is in a non-photometric state in which no temporary setting value is present. Furthermore, the digital camera 100 is also in the non-photometric state before the photometric processing is executed (before the start of the photometric processing). In other words, the digital camera 100 is in the photometric state during the execution of the photometric processing after it is started, and is in the non-photometric state before the start of the photometric processing and after the completion of the photometric processing. Then, upon the SW1 being turned on again after the photometric state has changed to the non-photometric state, the digital camera 100 executes the processing in steps S407 and S408, and is in the photometric state. Accordingly, when photometry is executed next, with respect to the exposure parameter whose setting value is "Auto" (for example, the shutter speed), a calculated photometric value is again acquired and a new temporary setting value is set.

With such processing, by executing photometric processing only for a predetermined time period after the SW1 has been operated, it is possible to acquire a temporary setting value and the exposure parameter that was set to "Auto". Note that, in the present embodiment, photometric processing and acquisition of a temporary setting value are assumed to be performed continuously until a predetermined time period has elapsed upon the SW1 being operated. However, it is also possible that photometric processing and acquisition of a temporary setting value are performed only one time in accordance with the operation of the SW1. In this case, the temporary setting value may be discarded as in step S411 when a predetermined time period has elapsed, so that the acquired value is made invalid.

In other words, in the present embodiment, the photometric state refers to a state in which photometric processing is executed and an effective temporary setting value is acquired, and the non-photometric state refers to a state in which no effective temporary setting value is present before the photometric processing is started, or after the photometric processing is complete.

As described above, the system control unit 50 performs photometry during an operation in an operation mode (predetermined operation mode) that is started upon the first shutter switch 62 being turned on, and stores a temporary setting value with respect to the exposure parameter that was set to "Auto" (automatic setting of a value). Then, when this operation mode is complete, the system control unit 50 deletes, from the system memory 52, the temporary setting value of the exposure parameter that was subjected to automatic setting, and sets the exposure parameter to "Auto". In other words, when the shutter speed is taken as an example, the setting value that was set to any of table numbers N, which are 0 to 54 (see FIG. 10A), is changed to 55. Accordingly, the exposure parameter that was set to "Auto" before the start of the photometry (at the time of the start) remains set to "Auto" also after the photometry is complete unless the setting value is not changed during the photometry, as will be described below.

Note here that a configuration has been described in which a setting value and a temporary setting value are distinguished, and thereby the exposure parameter that was set to "Auto" can remain set to "Auto" also after photometry is complete. However, specific implementation is not particularly limited, and, for example, a flag may be added to an item set to "Auto", and a setting value and a temporary setting value do not need to be distinguished strictly. Any configuration may be employed as long as a specific value for a parameter that was set to "Auto" is automatically set based on a photometry result, and the parameter remains set to "Auto" after photometry is complete.

Furthermore, as will be described later with reference to FIG. 9, there may be cases where a parameter automatically set based on a photometry result is subjected to parameter changing processing in the photometric state. In this case, the system control unit 50 may also perform control such that the parameter changed in the photometric state does not return to "Auto" after photometry is complete.

Referring again to FIG. 4B, in step S412, the system control unit 50 determines whether or not an operation to change the selected parameter position has been performed, as in step S401. The procedure moves to step S413 if the operation to change has been performed, and moves to step S414 if the operation to change has not been performed.

In step S413, the system control unit 50 performs the selected parameter position changing processing, as in step S402. The selected parameter position changing processing will be described in detail later with reference to FIG. 5.

In step S414, the system control unit 50 determines whether or not an operation to change a parameter has been performed, as in step S403. The procedure moves to step S416 if an operation has been performed, and moves to step S415 if an operation has not been performed.

In step S415, the system control unit 50 performs the parameter reset processing, as in step S404. The parameter reset processing will be described in detail later with reference to FIG. 6.

In step S416, the system control unit 50 performs the parameter changing processing in the photometric state. The parameter changing processing will be described in detail later with reference to FIG. 9.

In step S417, the system control unit 50 determines whether or not a shooting instruction has been given (whether or not the second shutter switch 64 is ON). If a shooting instruction has been given, the procedure moves to step S418, otherwise the procedure moves to step S407.

In step S418, the system control unit 50 performs shooting processing. In the shooting processing, the system control unit 50 controls the units of the digital camera 100 based on the set exposure parameters (setting values of the setting items) for the exposure adjustment mode to shoot an image.

Figure 5:
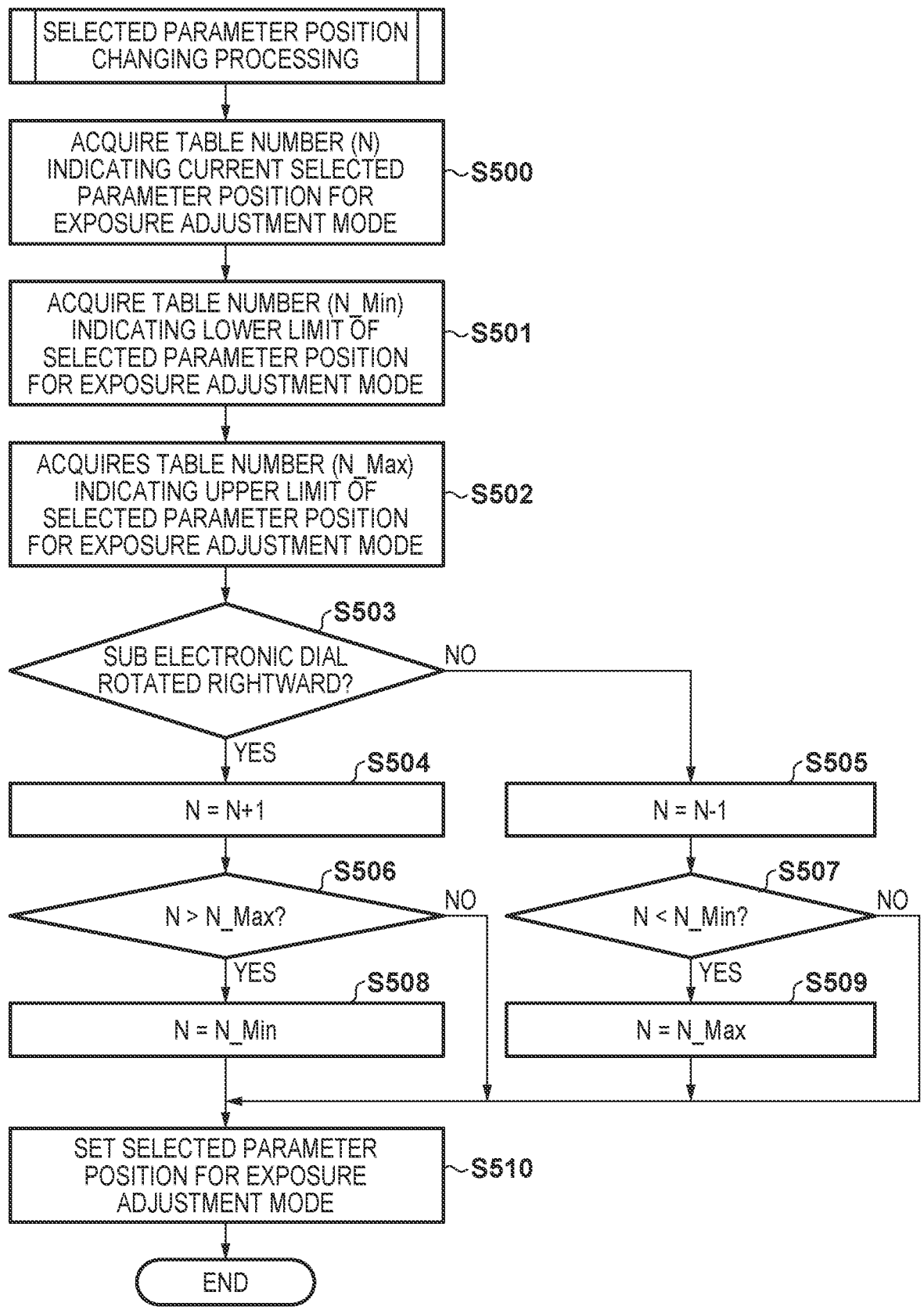
FIG. 5 is a flowchart of selected parameter position changing processing (steps S402 and S413 in FIGS. 4A and 4B).

The following will describe the selected parameter position changing processing (steps S402 and S413 in FIGS. 4A and 4B) in detail with reference to FIG. 5.

In step S500, the system control unit 50 acquires the table number that indicates the selected parameter position for the exposure adjustment mode that was acquired in step S304, with reference to the table shown in FIG. 10E. Note that the table is stored in the nonvolatile memory 56, and is expanded in the system memory 52 at the start of the processing of FIG. 5.

In step S501, the system control unit 50 acquires a table number (N_Min), which indicates the lower limit of the selected parameter position, with reference to the table shown in FIG. 10E.

In step S502, the system control unit 50 acquires a table number (N_Max), which indicates the upper limit of the selected parameter position, with reference to the table shown in FIG. 10E.

In step S503, the system control unit 50 determines whether or not the sub electronic dial 73 has been rotated rightward. The procedure moves to step S504 if the sub electronic dial 73 has been rotated rightward, and moves to step S505 if the sub electronic dial 73 has been rotated leftward.

In step S504, the system control unit 50 increments the table number (N) acquired in step S500. That is, the table number is updated to "N=N+1".

In step S505, the system control unit 50 decrements the table number (N) acquired in step S500. That is, the table number is updated to "N=N−1".

In step S506, the system control unit 50 determines whether or not the table number (N) incremented in step S504 exceeds the upper limit table number (N_Max) acquired in step S502. If N>N_Max, the procedure moves to step S508, otherwise the procedure moves to step S510.

In step S507, the system control unit 50 determines whether or not the table number (N) decremented in step S505 is lower than the lower limit table number (N_Min) acquired in step S501. If N<N_Min, the procedure moves to step S509, otherwise the procedure moves to step S510.

In step S508, the system control unit 50 substitutes the lower limit table number (N_Min) acquired in step S501 for the table number (N) indicating the current selected parameter position.

In step S509, the system control unit 50 substitutes the upper limit table number (N_Max) acquired in step S502 for the table number (N) indicating the current selected parameter position.

In step S510, the system control unit 50 sets a new selected parameter position, based on the table number (N) that indicates the current selected parameter position and has been updated in steps S503 to S509, and the table shown in FIG. 10E. Then, the system control unit 50 changes and displays, based on the new selected parameter position, the cursor display position on the setting display screen. For example, a state is taken in which, as shown in FIG. 11A, a cursor 1101 indicates the shutter speed. In this state, if the user repeatedly rotates the sub electronic dial 73 rightward, the setting display screen of the display unit 28 will be changed as shown from FIG. 11A, FIG. 11B, FIG. 11C, FIG. 11D, FIG. 11A, . . . , in the stated order. As a result of a new selected parameter position being set in accordance with an operation of the sub electronic dial 73 in this way, the currently selected parameter is changed, and the position on the setting display screen at which the cursor 1101 indicating the currently selected parameter is displayed is changed. Note that "A" on the setting display screens of FIG. 11A to FIG. 11D means that the setting value is "Auto".

A configuration may be employed in which the table number is not changed if the determination result of step S506 or S507 is Yes.

Figure 6:
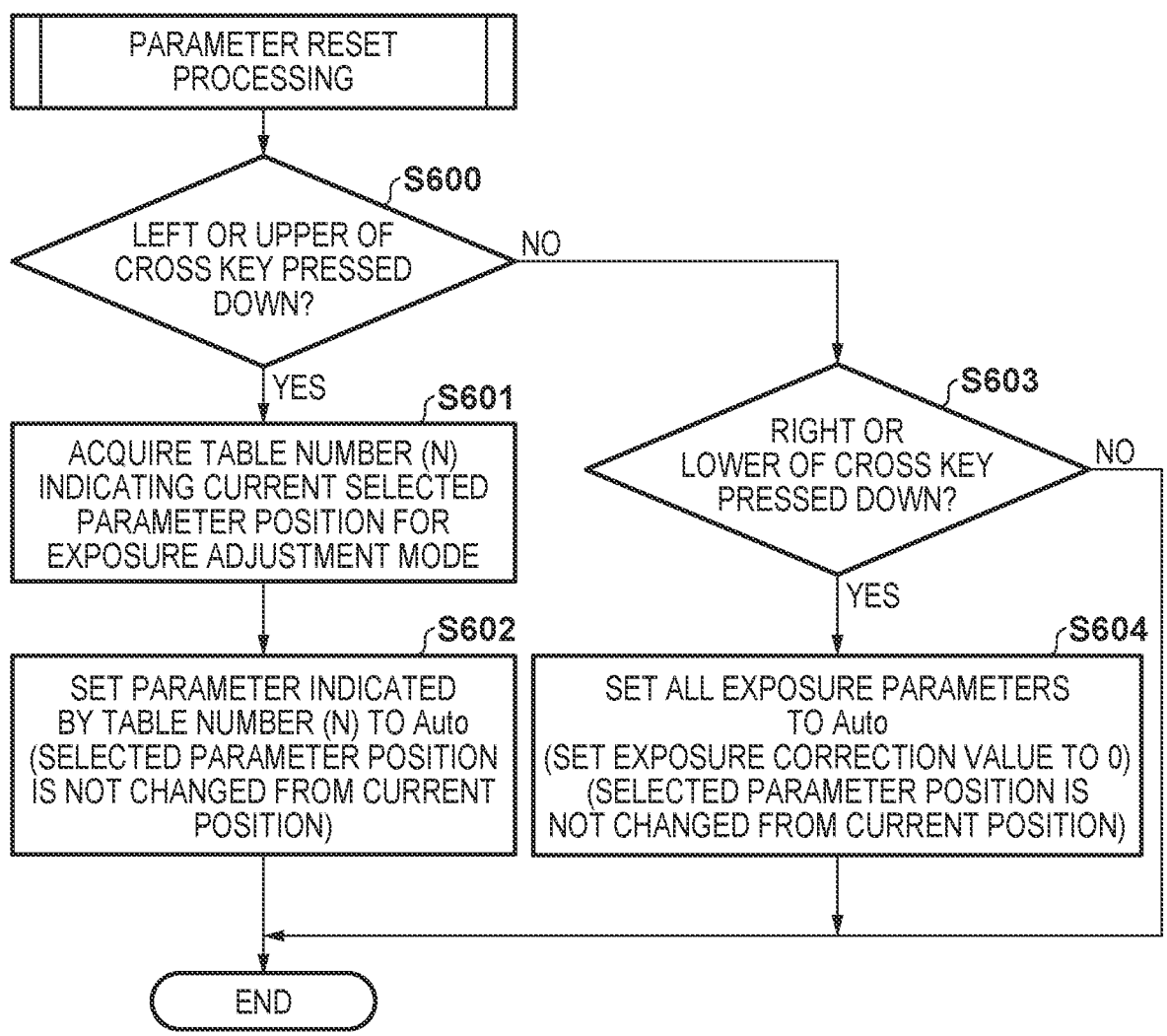
FIG. 6 is a flowchart of parameter reset processing (steps S404 and S415 in FIGS. 4A and 4B).

The following will describe the parameter reset processing (steps S404 and S415 in FIGS. 4A and 4B) in detail with reference to FIG. 6.

In step S600, the system control unit 50 determines whether or not the left key or upper key of the cross key 74 has been pressed down (whether or not the corresponding button has been pressed down). If the left key or upper key of the cross key 74 has been pressed down, the procedure moves to step S601, otherwise the procedure moves to step S603.

In step S601, the system control unit 50 acquires the table number (N) indicating the current selected parameter position for the exposure adjustment mode, based on the table shown in FIG. 10E.

Figure 12A:
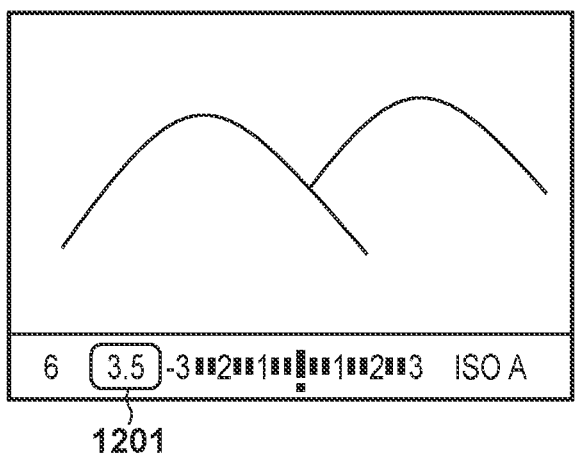
FIGS. 12A to 12C illustrate the parameter reset processing.
Figure 12B:
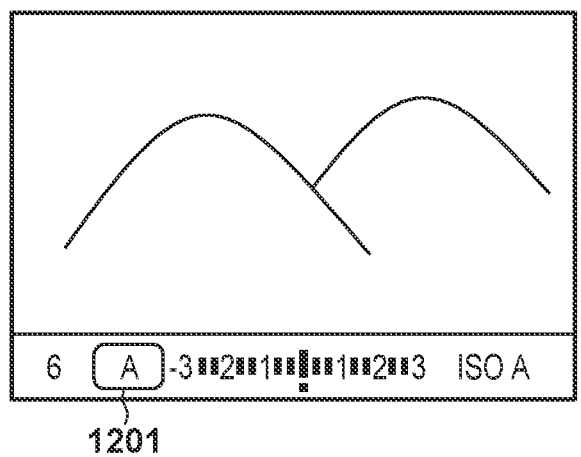

In step S602, the system control unit 50 sets the setting value of the parameter that is indicated by the table number (N) acquired in step S601 to "Auto" serving as an initial value, and updates the display of the setting value on the setting display screen in accordance with the change in the setting value. For example, a state is taken in which, as shown in FIG. 12A, the shutter speed is set to "6" (which means ⅙ of a second), the aperture value is set to "3.5" (which means F3.5), the ISO speed is set to "A" (which means "Auto"), and the exposure correction value is set to "0". Here, a cursor 1201 indicates the aperture value. If the processing in step S602 is performed in this state, the setting value of the aperture value is set to "Auto", and the setting display screen is changed from FIG. 12A to FIG. 12B.

Note that, even if the setting value of the parameter is reset and changed to "Auto", the selected parameter position is neither reset nor changed from the current position. Accordingly, the user can continue the previous operation to change a parameter after the reset operation.

With this control, it is possible to change only the selected aperture value to "Auto" (that is, the setting values of the items other than the selected setting item are not changed). In this example, it is possible to change the exposure setting to the same state as in the shutter-speed-priority mode, only with the operation of pressing down the cross key 74.

Note that, if the procedure of FIG. 6 is executed as the processing in step S415 in FIG. 4B, the exposure parameter that was originally set to "Auto" has a corresponding temporary setting value. Accordingly, for example in FIGS. 12A and 12B, the temporary setting value will be displayed, instead of "A", at the position that corresponds to the ISO speed. Furthermore, for the exposure parameter that was set to "Auto" in step S602, a corresponding temporary setting value is stored when the processing in step S408 is executed next. Therefore, for example in FIG. 12B, the temporary setting value will be displayed, instead of "A", at the position that corresponds to the aperture value. The same applies to the processing in step S604, which will be described later. While a temporary setting value is displayed, the setting is changed once to "Auto" in response to an instruction to change the temporary setting value to "Auto", but while photometry is being performed, the temporary setting value is immediately displayed based on the photometric result.

In step S603, the system control unit 50 determines whether or not the right key or lower key of the cross key 74 has been pressed down. If the right key or lower key of the cross key 74 has been pressed down, the procedure moves to step S605, otherwise the procedure ends.

Figure 12C:
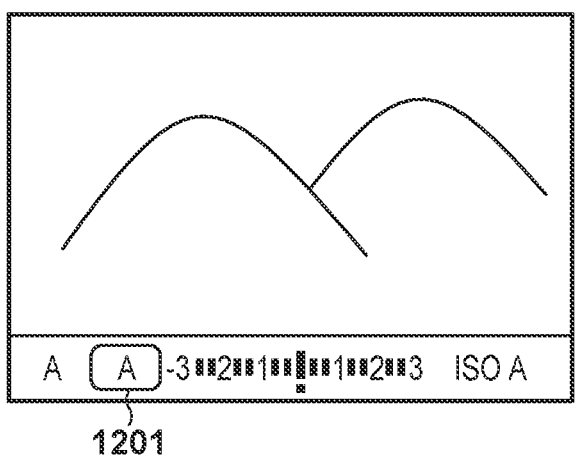

In step S604, the system control unit 50 sets all of the exposure parameters to "Auto" serving as an initial value, and updates the display of the setting value on the setting display screen in response to the change in the setting value. Note however that the exposure correction value is set to "0" serving as an initial value, because the exposure correction value does not have the setting value of "Auto" and cannot be set to "Auto". For example, the state shown in FIG. 12A is taken. In this case, not only the aperture value indicated by the cursor 1201 but also the shutter speed are changed to "Auto", and the setting display screen is changed from that in FIG. 12A to FIG. 12C.

Note that, even if the setting values of the parameters are reset and changed to "Auto", the selected parameter position is not changed from the current position. Accordingly, the user can continue the previous operation to change a parameter even after the reset operation.

With this control, it is possible to change both the shutter speed and the aperture value to "Auto". In this example, it is possible to change the exposure setting to the same state as in the program AE mode, simply with the operation of pressing down the cross key 74. Note that if the processing in step S604 is performed during the photometry, the shutter speed, the aperture value, and the ISO speed are changed to "Auto", and then are set to temporary setting values obtained based on the photometric results. An item such as the exposure correction value that does not have the setting of "Auto" may be set to an initial value or a predetermined standard value.

According to the reset processing in FIG. 6 in this way, it is possible to easily set, during display of a plurality of display items (such as "A") that correspond to a plurality of exposure parameters, the selected exposure parameter or all of the exposure parameters to "Auto", alternatively.

Note that the determination in step S600 or S603 may be performed based on a touch operation. The determination in step S600 may be Yes if the time period in which the touch panel 70a is touched is within a predetermined time period such as a time period from 0.3 seconds to 0.5 seconds, or a time period from 0.4 seconds to 1 second. Also, the determination in step S603 may be Yes if the time period in which the touch panel 70a is touched is within a predetermined time period (that is longer than the predetermined time period for step S600) such as a time period from 0.5 seconds to 1 second, or a time period from 0.8 seconds to 2 seconds.

Furthermore, a configuration is also possible in which, if an item is touched, the currently selected item is set to "Auto", an item for setting the entirety to "Auto" is displayed, and if the item is touched, the processing in step S604 is performed.

Furthermore, in place of the cross key 74, a dedicated button may be provided, or a function to set an item to "Auto" may be assigned to another button.

As described above, the determination in steps S600 and S603 may also be performed not only based on a touch operation, but also based on an operation of the cross key 74. Note that the above-described operation methods are merely examples, and the operation to set an item to "Auto" is not limited to the above-described examples.

As described above, the upper key or left key of the cross key 74 is pressed down to set the currently selected item to "Auto", and the lower key or right key of the cross key 74 is pressed down to set all items that can be set to "Auto" to "Auto". The cross key 74 is located near the grip 90, and can be operated by a user holding the grip 90. Accordingly, the cross key 74 is located at a position at which it is easily reached by the user's hand even when the user performs shooting in a shooting standby state while holding the camera in the landscape or portrait orientation. Furthermore, the positional relation between the key for giving an instruction to set the selected item to "Auto" and the key for giving an instruction to set all the items that can be set to "Auto" to "Auto" does not change between when the camera is held in the landscape orientation and when the camera is held in the portrait orientation, and thus operability is good. Specifically, when the camera is held in the landscape orientation, the upper key can be used to change the selected item to "Auto" and the lower key can be used to change all the items that can be set to "Auto" to "Auto". In other words, the selected item can be set to "Auto" by the user pressing the button of the cross key that is located upward in the gravity direction while holding the camera, and all the items that can be set to "Auto" can be set to "Auto" by the user pressing the button of the cross key that is located downward in the gravity direction.

When the camera is held in the portrait orientation, namely, when the camera is held in the portrait orientation with the grip 90 located downward in the gravity direction for example, the selected item can be changed to "Auto" by pressing the button (left key) of the cross key that is located upward in the gravity direction in the state in which the camera is held. Furthermore, all the items that can be set to "Auto" can be set to "Auto", by pressing the button (right key) of the cross key that is located downward in the gravity direction. Since the grip 90 is located on the right side of the digital camera 100 as viewed from the rear, the grip 90 is likely to be located downward in the gravity direction when the camera is held in the portrait orientation, and thus the operability is improved by making the upper key and the left key a set, and the lower key and the right key a set.

Figure 14:
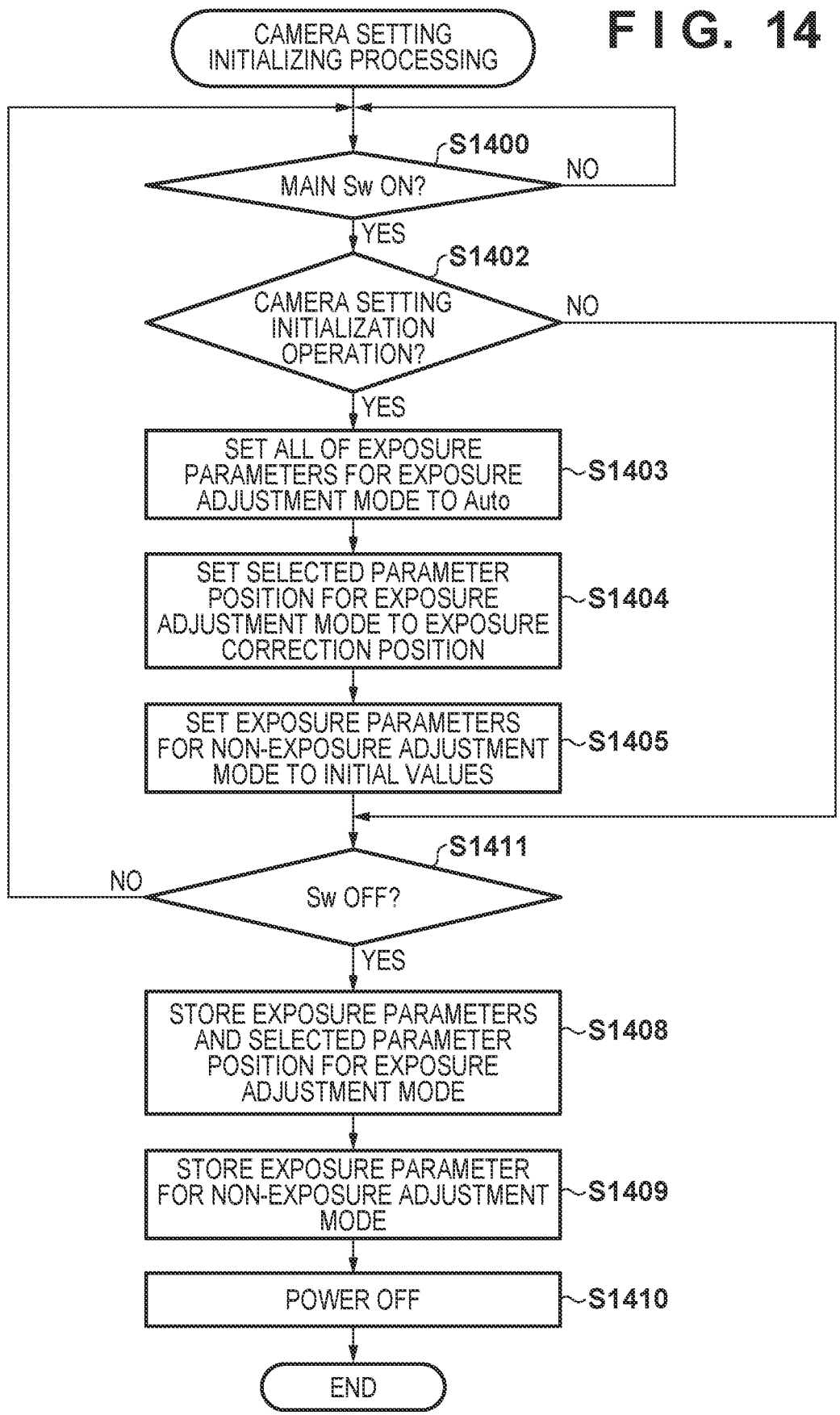
FIG. 14 is a flowchart of camera setting initializing processing.

The following will describe camera setting initializing processing with reference to FIG. 14. The camera setting initializing processing is executed upon the item of the camera setting initializing processing being selected on the menu screen.

In step S1400, the system control unit 50 determines whether or not the power supply switch 72 is ON. If the power supply switch 72 is ON, the procedure moves to step S1401, whereas if the power supply switch 72 is OFF, the processing in step S1400 is repeated.

In step S1402, the system control unit 50 determines whether or not an operation to initialize a camera setting has been performed. The procedure moves to step S1403 if the operation has been performed, and moves to step S1411 if the operation has not been performed.

In step S1403, the system control unit 50 sets all of the exposure parameters for the exposure adjustment mode to "Auto" serving as an initial value. Note however that the exposure correction value is set to "0" serving as an initial value, because the exposure correction value does not have the setting of "Auto".

In step S1404, the system control unit 50 sets the selected parameter position for the exposure adjustment mode to an initial position (exposure correction position).

In the present embodiment, the exposure correction position is used as the initial position, but another item may also be used. In the reset operation described with reference to FIG. 6, the selected parameter position for the exposure adjustment mode is not set to the initial position, but only the exposure parameter is initialized. In contrast, in the camera setting initializing processing, both the selected parameter position and the exposure parameters are initialized. In the reset operation described with reference to FIG. 6, the setting display screen for the exposure parameters for the exposure adjustment mode is displayed, and a reset operation is accepted in a state in which the operation to change an exposure parameter is possible. Accordingly, the selected parameter position is neither initialized nor changed at the time of the reset operation, so that the previous operation to change an exposure parameter can be continued also after the reset operation. The camera setting initializing processing is executed upon the camera setting initialization being selected on the menu screen, instead of during display of the setting display screen for the exposure parameters for the exposure adjustment mode. In other words, this is processing that is executed when an operation to change an exposure parameter for the exposure adjustment mode is not possible, and thus the selected parameter position is not kept but is initialized. In step S1405, the system control unit 50 sets the exposure parameters for the non-exposure adjustment mode to the initial values.

In step S1411, the system control unit 50 determines whether or not the power supply switch 72 is OFF. If the power supply switch 72 is OFF, the procedure moves to step S1408, otherwise the procedure returns to step S1400.

In step S1408, the system control unit 50 stores the exposure parameters and the selected parameter position for the exposure adjustment mode in the nonvolatile memory 56.

In step S1409, the system control unit 50 stores the exposure parameters set in modes different from the exposure adjustment mode in the nonvolatile memory 56.

In step S1410, the system control unit 50 turns the digital camera 100 off.

In the description above, in the camera setting initializing processing, the exposure parameters and the selected parameter position for the exposure adjustment mode, and the exposure parameters for the non-exposure adjustment mode are assumed to be initialized, but other settings may be initialized.

Figure 7:
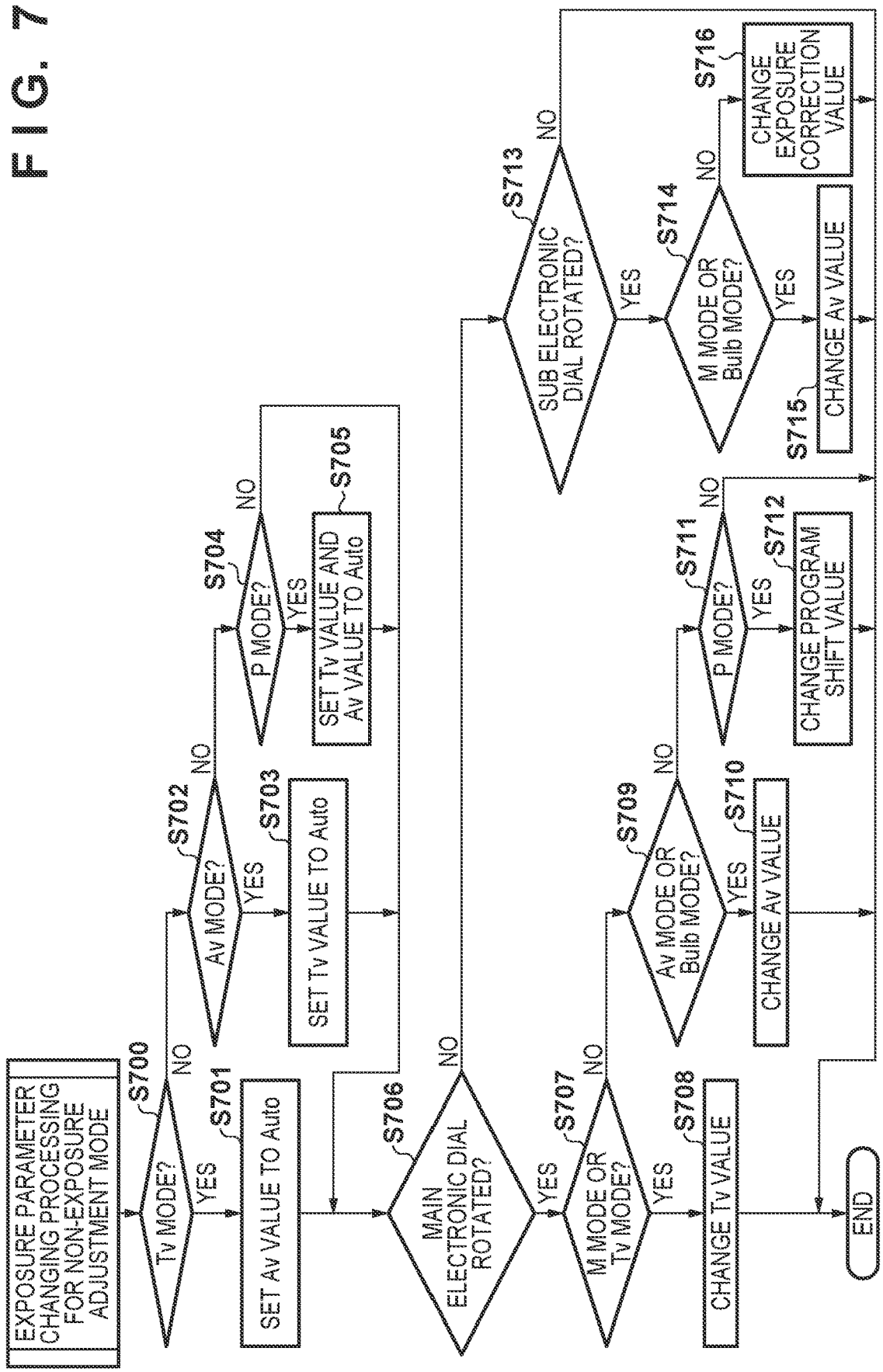
FIG. 7 is a flowchart of exposure parameter changing processing for a non-exposure adjustment mode (step S307 in FIG. 3).

The following will describe the exposure parameter changing processing for modes different from the exposure adjustment mode (step S307 in FIG. 3) in detail with reference to FIG. 7.

In step S700, the system control unit 50 determines whether or not the shooting mode is the shutter-speed-priority mode (Tv mode). If the shooting mode is the Tv mode, the procedure moves to step S701, otherwise the procedure moves to step S702.

In step S701, the system control unit 50 sets the aperture value to "Auto".

In step S702, the system control unit 50 determines whether or not the shooting mode is the aperture-priority mode (Av mode). If the shooting mode is the aperture-priority mode, the procedure moves to step S703, otherwise the procedure moves to step S704.

In step S703, the system control unit 50 sets the shutter speed to "Auto".

In step S704, the system control unit 50 determines whether or not the shooting mode is the program AE mode (program mode (P mode)). If the shooting mode is the P mode, the procedure moves to step S705, otherwise the procedure moves to step S706.

In step S705, the system control unit 50 sets the shutter speed and the aperture value to "Auto".

In step S706, the system control unit 50 determines whether or not the main electronic dial 71 has been operated. The procedure moves to step S707 if the main electronic dial 71 has been operated, and moves to step S713 if the main electronic dial 71 has not been operated.

In step S707, the system control unit 50 determines whether or not the shooting mode is the manual mode (M mode) or the shutter-speed-priority mode. If the shooting mode is the M mode or the Tv mode, the procedure moves to step S708, otherwise the procedure moves to step S709.

In step S708, the system control unit 50 changes the shutter speed.

In step S709, the system control unit 50 determines whether or not the shooting mode is the aperture-priority mode or a Bulb mode. If the shooting mode is the Bulb mode, which is a shooting mode in which exposure is performed while the shutter-release button 61 is pressed down, the shutter speed is not set and the setting of the Av value is changed. If the shooting mode is the Av mode or the Bulb mode, the procedure moves to step S710, otherwise the procedure moves to step S711.

In step S710, the system control unit 50 changes the aperture value.

In step S711, the system control unit 50 determines whether or not the shooting mode is the program AE mode. If the shooting mode is the P mode, the procedure moves to step S712, otherwise the procedure ends.

In step S712, the system control unit 50 changes the program shift value.

In step S713, the system control unit 50 determines whether or not the sub electronic dial 73 has been operated. The procedure moves to step S714 if the sub electronic dial 73 has been operated, and the procedure ends if the sub electronic dial 73 has not been operated.

In step S714, the system control unit 50 determines whether or not the shooting mode is the manual mode or the Bulb mode. If the shooting mode is the M mode or the Bulb mode, the procedure moves to step S715, otherwise the procedure moves to step S716.

In step S715, the system control unit 50 changes the aperture value.

In step S716, the system control unit 50 changes the exposure correction value.

With the above-described control, it is possible to set values in modes other than the exposure adjustment mode. In modes other than the exposure adjustment mode, a setting value of a setting item that was set by a user cannot be set to "Auto" within the same mode. For example, when the setting value of the Tv value that was set by the user is to be changed to "Auto", it is necessary to switch the mode from the Tv mode to the Av mode. Furthermore, when Tv and Av are to be set to "Auto" in the manual mode, it is necessary to switch the mode to the P mode.

Figure 8:
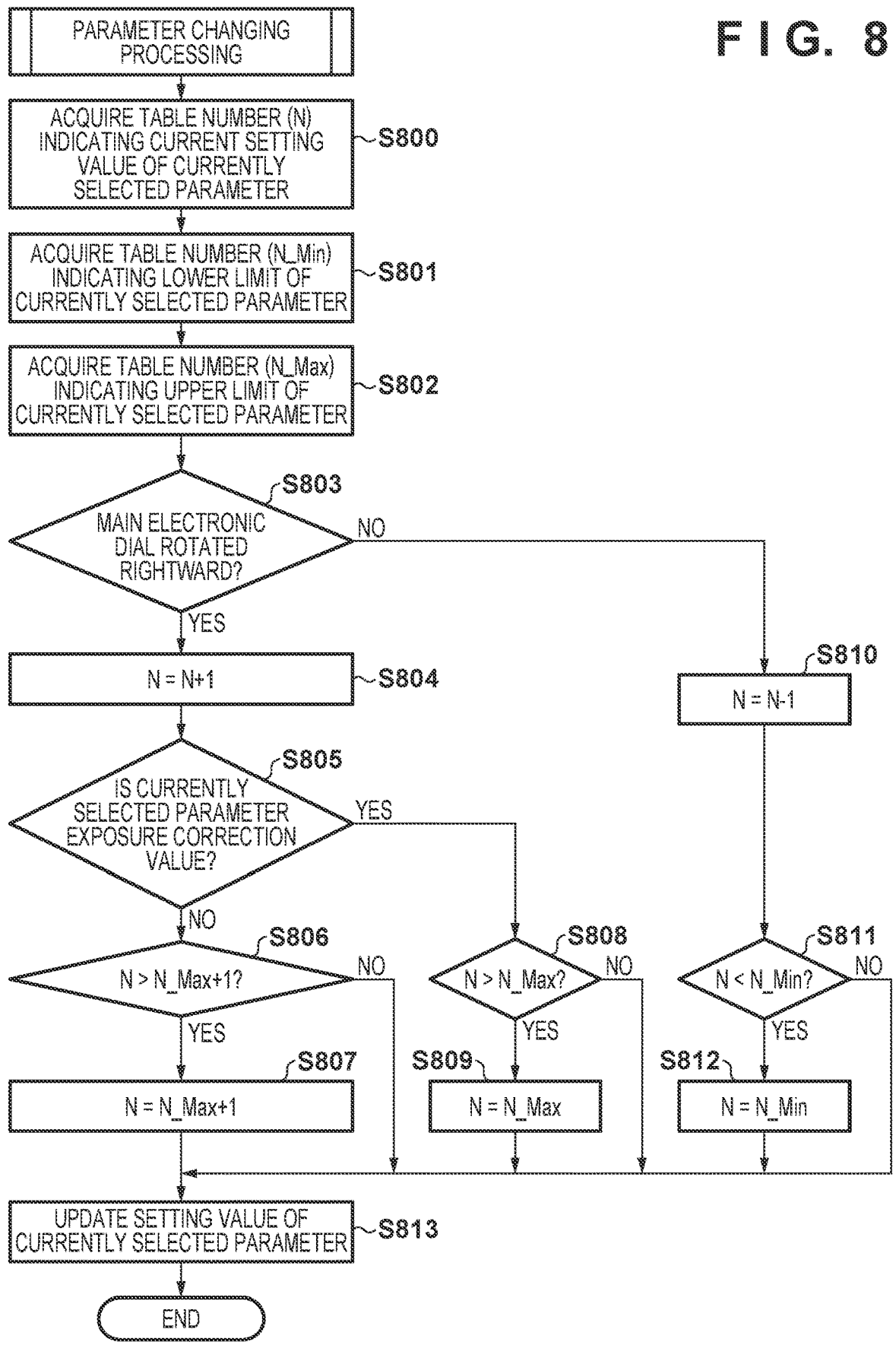
FIG. 8 is a flowchart of parameter changing processing in a non-photometric state in the exposure adjustment mode (step S405 in FIG. 4A).

The following will describe the parameter changing processing in a non-photometric state in the exposure adjustment mode (step S405 in FIG. 4A) in detail with reference to FIG. 8. The system control unit 50 can change parameters using the procedure of FIG. 8.

Figure 13A:
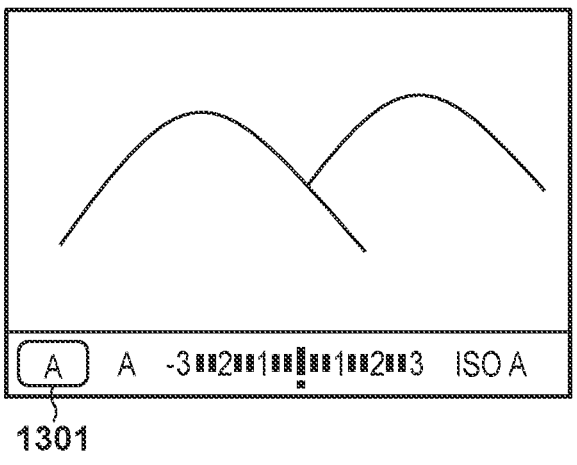
FIGS. 13A to 13E illustrate the parameter changing processing for the exposure adjustment mode.
Figure 13B:
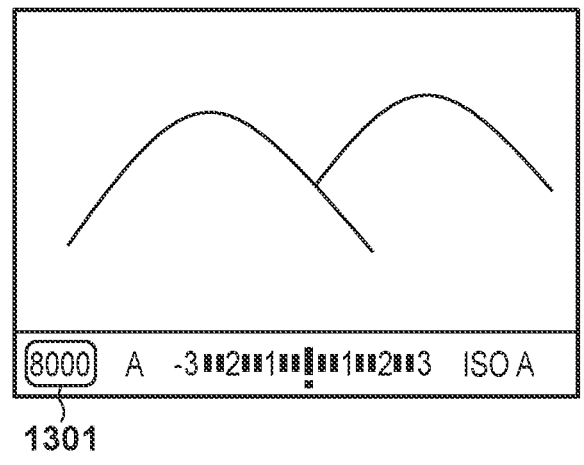

In step S800, the system control unit 50 acquires the table number (N) that indicates the current setting value of the currently selected parameter, with reference to one of the tables shown in FIGS. 10A to 10D that corresponds to the currently selected parameter. For example, a case where, as shown in FIG. 13A, a cursor 1301 indicates the shutter speed (that is, the currently selected parameter is the shutter speed) is taken. In this case, the system control unit 50 references the table shown in FIG. 10A. The current setting value of the shutter speed is "Auto", and thus the system control unit 50 acquires "55" as the table number (N). Note that the tables shown in FIGS. 10A to 10D are stored in, for example, the nonvolatile memory 56.

In step S801, the system control unit 50 acquires the table number (N_Min), which indicates the lower limit of the currently selected parameter, with reference to one of the tables shown in FIGS. 10A to 10D that corresponds to the currently selected parameter.

In step S802, the system control unit 50 acquires the table number (N_Max), which indicates the upper limit of the currently selected parameter, with reference to one of the tables shown in FIGS. 10A to 10D that corresponds to the currently selected parameter.

In step S803, the system control unit 50 determines whether or not the main electronic dial 71 has been rotated rightward. The procedure moves to step S804 if the main electronic dial 71 has been rotated rightward, and moves to step S810 if the main electronic dial 71 has been rotated leftward.

In step S804, the system control unit 50 increments the table number (N) acquired in step S800.

In step S805, the system control unit 50 determines whether or not the currently selected parameter is the exposure correction value. If the currently selected parameter is the exposure correction value, the procedure moves to step S808, otherwise the procedure moves to step S806.

In step S806, the system control unit 50 determines whether or not the table number (N) incremented in step S804 exceeds the table number (N_Max)+1, the table number (N_Max) being acquired in step S802. If N>N_Max+1, the procedure moves to step S807, otherwise the procedure moves to step S813.

In step S807, the system control unit 50 substitutes the table number (N_Max)+1, the table number (N_Max) being acquired in step S802, for the table number (N), which indicates the current setting value of the currently selected parameter.

In step S808, the system control unit 50 determines whether or not the table number (N) incremented in step S804 exceeds the table number (N_Max) acquired in step S802. If N>N_Max, the procedure moves to step S809, otherwise the procedure moves to step S813.

In step S809, the system control unit 50 substitutes the table number (N_Max) acquired in step S802 for the table number (N), which indicates the current setting value of the currently selected parameter.

In step S810, the system control unit 50 decrements the table number (N) acquired in step S800.

In step S811, the system control unit 50 determines whether or not the table number (N) decremented in step S810 is lower than the table number (N_Min) acquired in step S801. If N<N_Min, the procedure moves to step S812, otherwise the procedure moves to step S813.

In step S812, the system control unit 50 substitutes the table number (N_Min) acquired in step S801 for the table number (N), which indicates the current setting value of the currently selected parameter.

In step S813, the system control unit 50 acquires the setting value that corresponds to the table number (N) updated in steps S803 to S812, with reference to one of the tables shown in FIGS. 10A to 10D that corresponds to the currently selected parameter. Then, the system control unit 50 updates the setting value of the currently selected parameter based on the acquired setting value, and records the updated setting value in the system memory 52. The updated setting value is then displayed on the setting display screen. For example, a case is taken where the main electronic dial 71 is clicked leftward by one in the state of the setting display screen shown in FIG. 13A. In this case, the setting value of the shutter speed is changed from "Auto" to "1/8000 of a second", and the setting display screen is changed from FIG. 13A to FIG. 13B. Furthermore, when the main electronic dial 71 is clicked rightward by one in the state of the setting display screen shown in FIG. 13B, the setting value of the shutter speed is changed from "1/8000 of a second" to "Auto", and the setting display screen is changed to that in FIG. 13A. Accordingly, in the non-photometric state, the setting value can be changed to "Auto" and can be switched between a specific setting value and the setting value of "Auto".

Figure 9:
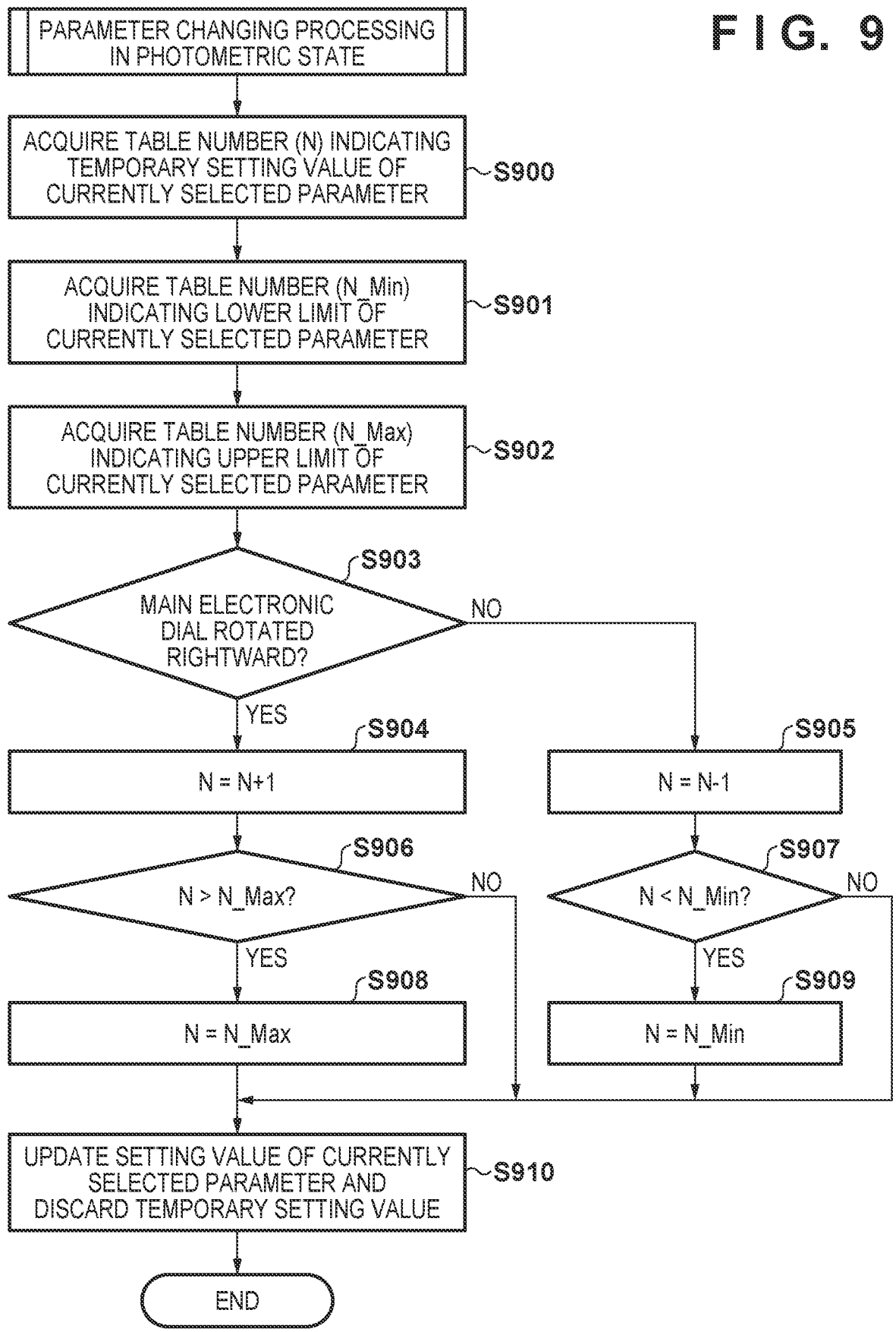
FIG. 9 is a flowchart of parameter changing processing in a photometric state in the exposure adjustment mode (step S416 in FIG. 4B).

The following will describe the parameter changing processing in the photometric state in the exposure adjustment mode (step S416 in FIG. 4B) with reference to FIG. 9.

In step S900, the system control unit 50 acquires the table number (N) that indicates the setting value or the temporary setting value of the currently selected parameter, with reference to one of the tables shown in FIGS. 10A to 10D that corresponds to the currently selected parameter (see S408). If the currently selected parameter is an item that was set to a value other than "Auto" before the start of the photometry, the table number of the setting value that has already been set by a user is acquired. Furthermore, the setting value is acquired even if the currently selected parameter was set to "Auto" before the start of the photometry, and even if the parameter changing processing of FIG. 9 has already been performed. If a temporary setting value calculated based on the photometric result was set, the temporary setting value is acquired from the system memory 52.

In step S901, the system control unit 50 acquires the table number (N_Min), which indicates the lower limit of the currently selected parameter, with reference to one of the tables shown in FIGS. 10A to 10D that corresponds to the currently selected parameter.

In step S902, the system control unit 50 acquires the table number (N_Max), which indicates the upper limit of the currently selected parameter, with reference to one of the tables shown in FIGS. 10A to 10D that corresponds to the currently selected parameter.

In step S903, the system control unit 50 determines whether or not the main electronic dial 71 has been rotated rightward. The procedure moves to step S904 if the main electronic dial 71 has been rotated rightward, and moves to step S905 if the main electronic dial 71 has been rotated leftward.

In step S904, the system control unit 50 increments the table number (N) acquired in S900.

In step S905, the system control unit 50 decrements the table number (N) acquired in step S900.

In step S906, the system control unit 50 determines whether or not the table number (N) incremented in step S904 exceeds the table number (N_Max) acquired in step S902. If N>N_Max, the procedure moves to step S908, otherwise the procedure moves to step S910.

In step S907, the system control unit 50 determines whether or not the table number (N) decremented in step S905 is lower than the table number (N_Min) acquired in step S901. If N<N_Min, the procedure moves to step S909, otherwise the procedure moves to step S910.

In step S908, the system control unit 50 substitutes the table number (N_Max) acquired in step S902 for the table number (N), which indicates the temporary setting value of the currently selected parameter.

In step S909, the system control unit 50 substitutes the table number (N_Min) acquired in step S901 for the table number (N), which indicates the temporary setting value of the currently selected parameter.

In step S910, the system control unit 50 acquires the setting value that corresponds to the table number (N) updated in step S903 to S909, with reference to one of the tables shown in FIGS. 10A to 10D that corresponds to the currently selected parameter. Then, the system control unit 50 updates the setting value of the currently selected parameter based on the acquired setting value and records, in the system memory 52, the updated setting value as a setting value and not as the temporary setting value. In other words, if an operation to change a temporary setting value to a setting value is made by a user, the changed value is recorded as the setting value in the system memory 52. Then, the system control unit 50 displays the updated setting value on the setting display screen.

Figure 13C:
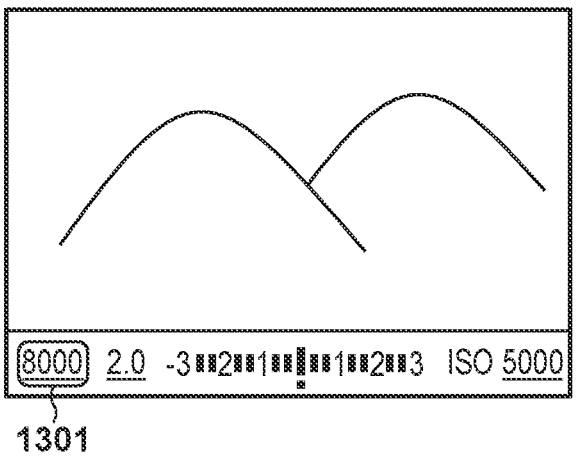
Figure 13D:
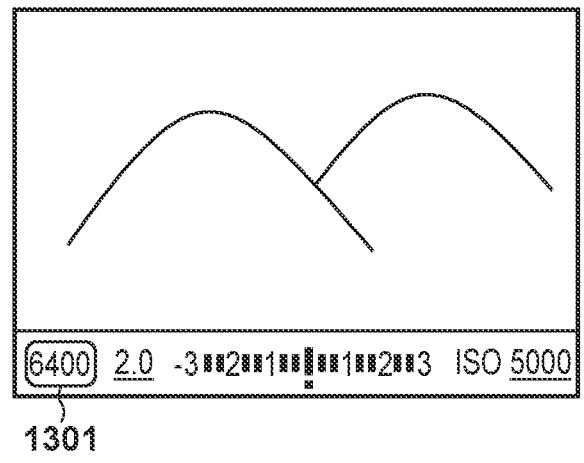
Figure 13E:
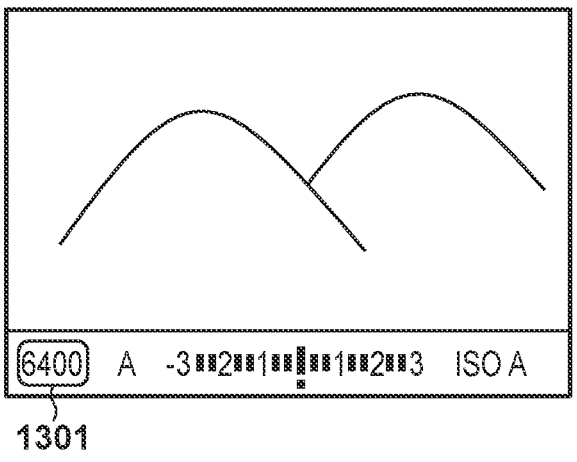

For example, a case is taken where the setting values of the shutter speed, the aperture value, and the ISO speed are "Auto", and the setting value of the exposure correction value is "0". In this case, before the start of photometry, the setting display screen of the display unit 28 is in the state shown in FIG. 13A. Then, when photometric processing is executed, and a temporary setting value is stored in step S408 in FIG. 4B, the setting display screen is changed to, for example, that in FIG. 13C, and displays temporary setting values for the setting values that were set to "Auto". Here, the temporary setting value of the shutter speed is "8000" (meaning ⅛₀₀₀), and the cursor 1301 indicates the shutter speed. In other words, the currently selected parameter is the shutter speed. The temporary setting value of the aperture value is "2.0" (meaning F2.0), and the temporary setting value of the ISO speed is "5000". Also, the items whose setting values were "Auto" and for which the temporary setting values are indicated are displayed with the temporary setting values underlined as shown in FIG. 13C. If, in this state, a user clicks the main electronic dial 71 leftward by one, N will change to "53" that corresponds to ⅟₆₄₀₀ of a second in step S905. Then, in step S910, the setting value of the shutter speed is updated from "Auto" to "⅟₆₄₀₀ of a second", and the temporary setting value (⅛₀₀₀ of a second) is deleted from the system memory 52. Alternatively, the temporary setting value is recorded, but is not used for shooting because the setting value has been set. In this case, the setting display screen of the display unit 28 is changed from that in FIG. 13C to that in FIG. 13D. In FIG. 13D, the shutter speed-related display shown in FIG. 13C is changed, and "6400", which means ⅟₆₄₀₀ of a second, is displayed as the shutter speed, where the shutter speed is no longer provided with an underline, which means that it is a temporary setting value. If a temporary setting value is designed to be displayed in the photometric state, it will be possible to check the setting value, for use in shooting, of the setting item set to "Auto". However, it will not be apparent whether the displayed setting value is a setting value selected by a user or a temporary setting value calculated in the photometric processing. Therefore, underlining a temporary setting value when it is displayed makes it possible for the user to identify that "Auto" was set and the displayed setting value is a temporary setting value calculated in the photometric processing. In the present embodiment, it is assumed that a temporary setting value is displayed with an underline. However, the display mode may be changed such that a setting value is displayed with another color or font, instead of being underlined. Moreover, display may also be performed such that, by adding a display item other than an underline, it is possible for the user to identify that the displayed setting value is a temporary setting value (that is, "Auto" was set). With this control, the exposure adjustment based on a calculated photometric value (temporary setting value) is possible in the photometric state.

Furthermore, if a user clicks the main electronic dial 71 rightward by two clicks in the state of the setting display screen shown in FIG. 13D, the setting value of the shutter speed is updated from "⅟₆₄₀₀ of a second" to "⅟₈₀₀₀ of a second", but is not updated to "Auto". That is, in the photometric state, it is not possible to change a setting value to "Auto". If, in the photometric state, a setting value other than "Auto" is changed to "Auto", photometry will be performed again and a temporary setting value is determined. Accordingly, in the photometric state, in contrast to the non-photometric state (see FIG. 8), a setting value is changed to "Auto" by operating the cross key 74, instead of operating the main electronic dial 71. Accordingly, it is possible to mitigate the possibility that, although a user has made a setting to "Auto", the user perceives that the setting has failed (because a temporary setting value is displayed although "Auto" was set indeed).

Furthermore, a case is taken where, in the state shown in FIG. 13D, the photometric timer has ended and the processing in step S411 in FIG. 4B is executed. In this case, the setting value of the shutter speed is updated to "⅟₆₄₀₀ of a second" in step S910, but the setting values of the aperture value and the ISO speed that are not subjected to exposure adjustment are kept as "Auto". Accordingly, in step S411, the setting values of the aperture value and the ISO speed are changed from the temporary setting values to "Auto", and the setting display screen of the display unit 28 is changed from FIG. 13D to FIG. 13E. In this way, if the photometric timer has ended, the parameters other than the parameters changed in the photometric state return to the setting value before the start of the photometry, namely, "Auto". Accordingly, from the next shooting onward, it is possible to immediately start shooting in the same state as that before the end of the previous shooting. Note that a configuration is also possible in which the setting value before the start of the photometry is stored when the setting value is updated in step S910, and upon the photometric timer ending, all of the parameters are returned to the setting values before the start of photometry. In other words, even if an item that was set to "Auto" is changed from a temporary setting value to a setting value, the item may be configured to return to "Auto" when the photometric timer has ended.

As described above, according to the first embodiment, the digital camera 100 can easily set a currently selected one of a plurality of display items to "Auto" and set the plurality of display items to "Auto", in accordance with an operation. The digital camera 100 performs control such that, while the plurality of display items are displayed, a selected exposure parameter is set to "Auto" in accordance with a first user operation (pressing down the left key of the cross key 74, for example). Furthermore, the digital camera 100 performs control such that, while a plurality of display items are displayed, a plurality of exposure parameters are set to "Auto" in accordance with a second user operation (pressing down the right key of the cross key 74, for example).

For example, if a user has manually changed a parameter setting but could not obtain a desired shooting state, it is possible to instantaneously set all the items whose parameters can be set to "Auto" to "Auto". Since it is possible to set any of the items to a setting value or to "Auto" depending on the shooting state, it is possible to quickly configure the desired exposure settings without switching the mode. Accordingly, it is possible to mitigate the possibility that a user misses a shooting opportunity due to he or she having failed to set desired setting values and adjusting the setting values, for example. Furthermore, if the brightness of an object has drastically changed, it is possible to easily perform shooting with appropriate exposure by setting all the items that can be set to "Auto" to "Auto" without changing the setting values of the items one by one. Furthermore, for example, basically if a user also desires to perform shooting while changing the setting value of the shutter speed without changing the aperture value set to "Auto" (corresponding to the Tv mode), the shutter speed can easily be set to the appropriate exposure (Auto), and thus it is possible to quickly set the setting value desired by the user.

The exposure adjustment mode is, for example, advantageous for a case where, in a manual mode shooting, a followed object in a bright state with his or her back to the sun suddenly becomes dark when clouds are formed, and the object brightness undergoes a large change, and the current setting is deviated from the setting for obtaining appropriate exposure. In such a case, a user wants to promptly achieve appropriate exposure and perform shooting, but needs to operate the mode selection switch 60 to realize the P mode in order to easily achieve appropriate exposure in one action. When, for example, a user wants to change the depth of field after appropriate exposure is realized, the user only need to place the cursor on the Av value and rotate the dial to fix the Av value, and when a user wants to change the flow of an object, similarly, the user only need to place the cursor on the Tv value and rotate the dial to fix the Tv value. In this way, it is possible to quickly set appropriate exposure, and change the setting value of the item selected by the user without performing an operation to change the mode after the appropriate exposure has been achieved. In other words, in the exposure adjustment mode, it is possible to realize a state that functions substantially as the P mode, in one action without changing the mode, and it is possible to change the setting value of the item desired by the user only by rotating the dial, without changing the mode from the state in which the appropriate exposure was achieved.

Furthermore, if after the setting was changed, the object brightness drastically changes again during shooting, the operation of the P mode is continued by setting the item to "Auto", and thus it is possible to perform shooting with appropriate exposure. Accordingly, it is possible to switch between the operations corresponding to the P mode, the Av mode, the Tv mode, and the M mode, and thus, if the brightness has drastically changed, or there is a desire to change blurring or a flow from the appropriate exposure state, it is possible to configure settings quickly without switching the mode.

Furthermore, if the brightness has drastically changed in operation corresponding to the M mode, and a user does not want to change the aperture value from the current setting but wants to quickly change only the shutter speed, it is possible to set only the shutter speed to "Auto". For example, if the shutter speed is set to $\frac{1}{2500}$, and the user wants to change the setting value to about $\frac{1}{320}$ due to a drastic change in brightness, the user needs to rotate the dial from $\frac{1}{2500}$ to $\frac{1}{320}$ in the M mode (for example, by 9 clicks). Here, in the exposure adjustment mode, it is possible to change the setting value to about $\frac{1}{320}$ by setting "Auto" in one action. For example, if the setting value can be changed to $\frac{1}{250}$ in one action by setting "Auto", the user only needs to rotate the dial by one click, realizing a reduction in the amount of operation.

As described above, it is possible to perform the same operations as all of the mode changing operations, without changing the mode.

In the above-described embodiment, the difference in the operation method between a dial rotating operation (first operation) for changing the setting value of a selected item and a button operation (second operation) for setting an item to "Auto" has been explained. Accordingly, the user can distinguish and recognize, based on the operation method, whether the settings are changed individually or simply set to "Auto". In a case where a touch operation is performed, a bar with which the option of setting values and "Auto" can be selected (for example, "Auto" is located at an end position) is provided, and by touching the bar, it is possible to change the setting. Furthermore, it is also possible that an item for setting a selected item to "Auto", and an item for setting all items that can be set to "Auto" to "Auto" are displayed, and by touching any of the items, it is possible to configure settings.

The description has been given that any of "Auto" and options of a plurality of setting values can be set in accordance with a dial operation, but it is also possible that "Auto" is not set in accordance with the dial operation. That is, it is possible that, for example, a setting value can be set from a plurality of setting values excluding "Auto" in accordance with a dial operation, and "Auto" can be set in accordance with a button operation. Moreover, when a touch operation is performed, a bar indicating options of setting values without "Auto", and an item indicating "Auto" may also be displayed separately.

Note that, in the description above, exposure parameters (at least one setting item relating to exposure control) are used as examples of setting items. However, the setting items of the present embodiment are not limited to the exposure parameters. For example, the setting items may be setting items relating to the ranging point of Automatic Focus. In this case, the configuration of the present embodiment is applicable to a configuration that performs control such that, when a user has operated the main electronic dial 71 during automatic ranging control in Automatic Focus, the ranging point is changed from a tracking ranging point to any ranging point. Alternatively, the setting items may be setting items relating to Automatic White Balance.

Note that a single item of hardware may perform various types of control that have been described as being performed by the system control unit 50, or the entire apparatus may be controlled by a plurality of items of hardware sharing processing.

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate.

The foregoing embodiments have dealt with an example in which the present invention is applied to the digital camera 100, but are not limited to these examples, and the present invention is applicable to a control apparatus for controlling setting items. That is to say, the present invention is applicable to, for example, the following apparatuses: a personal computer, a PDA, a mobile telephone terminal, a portable image viewer, a printer device having a display, a digital photo frame, a music player, and the like. Furthermore, the present invention is also applicable to a game console, an e-book reader, a tablet terminal, a smartphone, a projector, a home electric appliance having a display, an on-board apparatus having a display, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-169607, filed Sep. 4, 2017, Japanese Patent Application No. 2018-111219, filed Jun. 11, 2018, and Japanese Patent Application No. 2018-111220, filed Jun. 11, 2018, which are hereby incorporated by reference herein in their entirety.

What is claimed is:

1. An image capturing control apparatus comprising at least one memory and at least one processor which function as:
   (1) an image capturing control unit configured to control image capturing by an image capturing unit based on setting values of a plurality of setting items;
   (2) a selection unit configured to select a setting item from among the plurality of setting items;
   (3) a changing unit configured to change the setting value of the setting item selected by the selection unit to a setting value that is selected in accordance with a first operation from among a plurality of setting values that correspond to the selected setting item and a specific setting value to which one of the plurality of setting values that is automatically determined in accordance with predetermined processing is applied; and
   (4) a reset unit configured to change the setting value of a setting item included in the plurality of setting items to the specific setting value,
   wherein in a first state where any of the plurality of setting values different from the specific setting value is set to a first setting item and a second setting item of the plurality of setting items: (a) the specific setting value is set to the first setting item and the second setting item, in accordance with a second operation, and (b) the specific setting value is set to the setting item selected by the selection unit and a setting value of a setting item which is not selected by the selection unit is not changed, in accordance with a third operation.

2. The image capturing control apparatus according to claim 1, wherein the reset unit changes, in accordance with the second operation, the setting values of all setting items of the plurality of setting items, for which the specific setting value can be set, to the specific setting value.

3. The image capturing control apparatus according to claim 1, wherein the at least one memory and at least one processor further function as a control unit configured to perform control such that (a) a change to the specific setting value in accordance with the first operation is enabled before the predetermined processing is executed, and (b) a change to the specific setting value in accordance with the first operation is disabled after the predetermined processing has been executed.

4. The image capturing control apparatus according to claim 3, wherein the control unit performs control such that a change to the specific setting value in accordance with the first operation is disabled, if a setting value applicable when the specific setting value is set is automatically determined by the predetermined processing.

5. The image capturing control apparatus according to claim 3, wherein the control unit performs control such that (a) a change to the specific setting value in accordance with the first operation is disabled until a predetermined time period elapses from start of the predetermined processing, and (b) a change to the specific setting value in accordance with the first operation is enabled upon the predetermined time period elapsing from the start of the predetermined processing.

6. The image capturing control apparatus according to claim 1, wherein the at least one memory and at least one processor further function as a display control unit configured to control a display unit to display a setting display screen that displays the setting values of the plurality of setting items,
wherein the display control unit performs control such that, for the setting item for which the specific setting value is set, a setting value automatically determined by the predetermined processing is displayed, instead of the specific setting value.

7. The image capturing control apparatus according to claim 6, wherein the display control unit performs control such that, for the setting item for which the specific setting value is set, (a) the specific setting value is displayed before the predetermined processing is executed, and (b) a setting value automatically determined by the predetermined processing is displayed, instead of the specific setting value, after the predetermined processing has been executed.

8. The image capturing control apparatus according to claim 7, wherein the display control unit performs control such that, for the setting item for which the specific setting value is set, a setting value automatically determined by the predetermined processing is displayed, instead of the specific setting value, for as long as the setting value determined by executing the predetermined processing is effective.

9. An image capturing control apparatus comprising at least one memory and at least one processor which function as:
(1) a mode changing unit configured to set, as an exposure setting mode, any of a plurality of modes, the plurality of modes including: (a) a shutter-speed-priority mode in which an aperture value is automatically set based on a shutter speed that is selected by a user, (b) an aperture-priority mode in which a shutter speed is automatically set based on an aperture value that is selected by the user, (c) a manual mode in which setting values for a shutter speed and an aperture value are selected by the user from among setting value candidates excluding Auto, (d) a program mode in which setting values for a shutter speed and an aperture value are automatically set, and (e) a specific exposure setting mode in which setting values for a shutter speed and an aperture value are selected and set from among Auto and a plurality of setting value candidates;
(2) a selection unit configured to select one of a plurality of setting items including a shutter speed and an aperture value in a case where the specific exposure setting mode is set by the mode changing unit; and
(3) a setting unit configured to set, in accordance with a first operation, one of the Auto and the plurality of setting value candidates to the setting item selected by the selection unit in the specific exposure setting mode.

10. The image capturing control apparatus according to claim 9, wherein the setting unit sets the Auto to the setting item selected by the selection unit in accordance with a second operation being made, both (a) in a case where a first setting item is selected by the selection unit among the first setting item and a second setting item included in the plurality of setting items and (b) in a case where the second setting item is selected by the selection unit, and
wherein the setting unit sets the Auto to the first setting item and the second setting item in accordance with a third operation being made both (a) in a case where the first setting item is selected by the selection unit and (b) in a case where the second setting item is selected by the selection unit.

11. A control method executed by an image capturing control apparatus, comprising:
controlling image capturing by an image capturing unit based on setting values of a plurality of setting items;
selecting a setting item from among the plurality of setting items;
changing the setting value of the setting item selected in the selecting to a setting value that is selected in accordance with a first operation from among a plurality of setting values that correspond to the selected setting item and a specific setting value to which one of the plurality of setting values that is automatically determined in accordance with predetermined processing is applied; and
changing the setting value of a setting item included in the plurality of setting items to the specific setting value,
wherein in a first state where any of the plurality of setting values different from the specific setting value is set to a first setting item and a second setting item of the plurality of setting items: (a) the specific setting value is set to the first setting item and the second setting item, in accordance with a second operation, and (b) the specific setting value is set to the setting item selected in the selecting and a setting value of a setting item which is not selected in the selecting is not changed, in accordance with a third operation.

12. A non-transitory computer-readable storage medium which stores a program for causing a computer to execute a control method comprising:
controlling image capturing by an image capturing unit based on setting values of a plurality of setting items;
selecting a setting item from among the plurality of setting items;
changing the setting value of the setting item selected in the selecting to a setting value that is selected in accordance with a first operation from among a plurality of setting values that correspond to the selected setting item and a specific setting value to which one of the plurality of setting values that is automatically determined in accordance with predetermined processing is applied; and
changing the setting value of a setting item included in the plurality of setting items to the specific setting value,
wherein in a first state where any of the plurality of setting values different from the specific setting value is set to a first setting item and a second setting item of the plurality of setting items: (a) the specific setting value is set to the first setting item and the second setting item, in accordance with a second operation, and (b) the specific setting value is set to the setting item selected in the selecting and a setting value of a setting item which is not selected in the selecting is not changed, in accordance with a third operation.

13. A control method executed by an image capturing control apparatus, comprising:
setting, as an exposure setting mode, any of a plurality of modes, the plurality of modes including: (a) a shutter-speed-priority mode in which an aperture value is automatically set based on a shutter speed that is selected by a user, (b) an aperture-priority mode in which a shutter speed is automatically set based on an aperture value that is selected by the user, (c) a manual mode in which setting values for a shutter speed and an aperture value are selected by the user from among setting value candidates excluding Auto, (d) a program mode in which setting values for a shutter speed and an aperture value are automatically set, and (e) a specific exposure setting mode in which setting values for a shutter speed and an aperture value are selected and set from among Auto and a plurality of setting value candidates;

selecting one of a plurality of setting items including a shutter speed and an aperture value in a case where the specific exposure setting mode is set; and setting, in accordance with a first operation, one of the Auto and the plurality of setting value candidates to the setting item selected in the selecting in the specific exposure setting mode.

14. A non-transitory computer-readable storage medium which stores a program for causing a computer to execute a control method comprising:

setting, as an exposure setting mode, any of a plurality of modes, the plurality of modes including: (a) a shutter-speed-priority mode in which an aperture value is automatically set based on a shutter speed that is selected by a user, (b) an aperture-priority mode in which a shutter speed is automatically set based on an aperture value that is selected by the user, (c) a manual mode in which setting values for a shutter speed and an aperture value are selected by the user from among setting value candidates excluding Auto, (d) a program mode in which setting values for a shutter speed and an aperture value are automatically set, and (e) a specific exposure setting mode in which setting values for a shutter speed and an aperture value are selected and set from among Auto and a plurality of setting value candidates;

selecting one of a plurality of setting items including a shutter speed and an aperture value in a case where the specific exposure setting mode is set; and setting, in accordance with a first operation, one of the Auto and the plurality of setting value candidates to the setting item selected in the selecting in the specific exposure setting mode.

\* \* \* \* \*